(12) United States Patent
Matkovic

(10) Patent No.: US 8,548,859 B2
(45) Date of Patent: Oct. 1, 2013

(54) POINT OF SALE NETWORK ROUTER

(75) Inventor: Ivan Antony Matkovic, Cupertino, CA (US)

(73) Assignee: Spendgo, Inc., San Francisco (*) Notice: Subject to any disclaimer, the term of this patent is extended or adjusted under 35 U.S.C. 154(b) by 658 days.

(21) Appl. No.: 12/692,461

(22) Filed: Jan. 22, 2010

(65) Prior Publication Data

US 2011/0184822 A1    Jul. 28, 2011

(51) Int. Cl.
*G06Q 20/00*    (2012.01)
*G06G 1/12*     (2006.01)

(52) U.S. Cl.
USPC .................................. 705/18; 705/16; 705/21

(58) Field of Classification Search
USPC ........................................................... 705/18
See application file for complete search history.

(56) References Cited

U.S. PATENT DOCUMENTS

| | | | |
|---|---|---|---|
| 5,739,512 A * | 4/1998 | Tognazzini | 235/380 |
| 5,915,022 A | 6/1999 | Robinson et al. | |
| 5,924,077 A * | 7/1999 | Beach et al. | 705/7.29 |
| 6,067,529 A | 5/2000 | Ray et al. | |
| 6,185,542 B1 | 2/2001 | Moran et al. | |
| 6,302,326 B1 * | 10/2001 | Symonds et al. | 235/379 |
| 6,341,353 B1 * | 1/2002 | Herman et al. | 726/5 |
| 6,487,540 B1 | 11/2002 | Smith et al. | |
| 6,543,683 B2 * | 4/2003 | Hoffman | 235/375 |
| 6,738,749 B1 | 5/2004 | Chasko | |
| 6,980,962 B1 * | 12/2005 | Arganbright et al. | 705/14.31 |
| 6,996,546 B1 * | 2/2006 | Giles et al. | 705/60 |
| 7,069,240 B2 * | 6/2006 | Spero et al. | 705/30 |
| 7,089,322 B1 * | 8/2006 | Stallmann | 709/238 |
| 7,158,948 B1 | 1/2007 | Rodriguez et al. | |
| 7,213,258 B1 * | 5/2007 | Kesarwani et al. | 726/3 |
| 7,272,569 B1 * | 9/2007 | Walker et al. | 705/16 |
| 7,376,585 B2 | 5/2008 | Haller | |
| 7,475,039 B2 * | 1/2009 | Remington et al. | 705/40 |
| 7,542,919 B1 * | 6/2009 | Mueller et al. | 705/16 |
| 7,587,334 B2 * | 9/2009 | Walker et al. | 705/16 |
| 7,600,673 B2 * | 10/2009 | Stoutenburg et al. | 235/380 |
| 7,636,689 B2 * | 12/2009 | Dent et al. | 705/40 |
| 7,761,314 B2 * | 7/2010 | Fitzgerald et al. | 705/5 |
| 8,315,909 B1 * | 11/2012 | Barker | 705/16 |
| 2002/0156683 A1 * | 10/2002 | Stoutenburg et al. | 705/16 |
| 2003/0097317 A1 * | 5/2003 | Burk et al. | 705/30 |
| 2003/0120607 A1 | 6/2003 | Piotrowski | |

(Continued)

OTHER PUBLICATIONS

Paper chase is over, Anonymous, Building design, Jun. 19, 2009: 17.*

(Continued)

*Primary Examiner* — Garcia Ade
*Assistant Examiner* — Harshad Parikh
(74) *Attorney, Agent, or Firm* — Knobbe, Martens, Olson & Bear LLP

(57) ABSTRACT

Systems and methods are provided for routing data. A device is provided that includes a first data port configured to be coupled to a printer port of a point of sale system, a second data port configured to be coupled to a remote system, an optional third data port configured to be coupled to a printer, and a computing device configured to receive, via the first data port, printer control codes and receipt data from the point of sale system printer port, transmit at least a portion of the receipt data to the remote system, and optionally transmit at least a portion of the printer control codes and receipt data to the printer.

20 Claims, 18 Drawing Sheets

(56) References Cited

U.S. PATENT DOCUMENTS

| | | | |
|---|---|---|---|
| 2003/0158819 | A1 | 8/2003 | Scott |
| 2004/0083134 | A1* | 4/2004 | Spero et al. ............... 705/16 |
| 2005/0021480 | A1* | 1/2005 | Haff et al. ............... 705/75 |
| 2006/0224449 | A1* | 10/2006 | Byerley et al. ............... 705/14 |
| 2007/0045405 | A1* | 3/2007 | Rothschild ............... 235/380 |
| 2007/0106613 | A1* | 5/2007 | Murphy ............... 705/44 |
| 2009/0067729 | A1 | 3/2009 | Turkelson et al. |
| 2009/0119574 | A1* | 5/2009 | Gitlin et al. ............... 715/209 |
| 2011/0184822 | A1* | 7/2011 | Matkovic ............... 705/18 |
| 2012/0221421 | A1* | 8/2012 | Hammad ............... 705/16 |
| 2012/0284133 | A1* | 11/2012 | Espela et al. ............... 705/24 |

OTHER PUBLICATIONS

Elmblad, Shelley, *What is NEAT Receipts?*, About.com: Financial Software, web.archive.org/web/20071118110725, dated Nov. 18, 2007.

Elmblad, Shelley, *NEAT Receipts Software Organization*, About. com: Financial Software, web.archive.org/web/20071118110730, dated Nov. 18, 2007.

Elmblad, Shelley, *NEAT Receipts Scanner*, About.com: Financial Software, web.archive.org/web/20071118110735, dated Nov. 18, 2007.

Elmblad, Shelley, *Installing and Getting Started with NEAT Receipts*, About.com: Financial Software, web.archive.org/web/20071118110740, dated Nov. 18, 2007.

Elmblad, Shelley, *Exporting NEAT Receipts Data to Other Applications*, About.com:Financial Software, web.archive.org/web/20071118110745, dated Nov. 18, 2007.

Elmblad, Shelley, *Transaction Splits in NEAT Receipts*, About. com:Financial Software, web.archive.org/web/20071118110750, dated Nov. 18, 2007.

Elmblad, Shelley, *NEAT Receipts Help*, About.com:Financial Software, web.archive.org/web/20071118110755, dated Nov. 18, 2007.

Elmblad, Shelley, *NEAT Receipts Scanalizer Review—Should you Buy NEAT Receipts?*, About.com:Financial Software, web.archive. org/web/20071118110800, dated Nov. 18, 2007.

Productivity 501, Review of Shoeboxed.com, www.productivity501. com/review-of-shoeboxedcom/910, dated Jun. 26, 2008.

Selvidge, Michael, Mobile Industry Review, *App Review (iPhone), Shoeboxed, a stonking way to manage receipts*, www. mobileindustryreview.com/2009/12, dated Dec. 1, 2009.

Ali, Imran, Worker Daily, *Shoeboxed: Organise Your Receipts*, webworkerdaily.com/2008/06/16, dated Jun. 16, 2008.

AllEtronic, *Digital Receipts* www.alletronic.com, dated 2009.

* cited by examiner

Blackdust Design
www.blackdust.com
213-228-0020

INVOICE #27
Cash Purchase

DATE\TIME: 1/12/2009 8:50:17 AM
CASHIER: 01
STATION: 01
==============================
Tide detergent-72-96027-0008
1              @      $6.950       $6.95
Tide detergent-72-96027-0008
1              @      $6.950       $6.95
==============================

GRAND TOTAL                    $13.90

Amt Tendered                      $20.00
Change due                         $6.10
Cash Amount        $13.90

FIG. 6

```
00000100  4D 00 1B 74 10 1D 21 00 1B 45 00 1B 4A 24  M..t..!..E..J.$
00000110  00 00 44 41 54 45 5C 54 49 4D 45 3A 20 31 2F 36  ..DATE\TIME: 1/6
00000120  2F 32 30 30 39 20 31 31 3A 34 31 3A 35 35 20 41  /2009 11:41:55 A
00000130  4D 1B 4A 30 30 1B 24 30 00 1B 43 41 53 48 49 45 52 3A  M.J0.$..CASHIER:
00000140  20 30 31 1B 4A 31 30 1B 24 30 00 1B 53 54 41 54 49 4F   01.J10.$..STATIO
00000150  4E 3A 20 30 31 1B 4A 60 00 1B 24 60 00 1B 3D 3D  N: 01.J`..$`..==
00000160  3D 3D 3D 3D 3D 3D 3D 3D 3D 3D 3D 3D 3D 3D 3D 3D
00000170  3D 3D 3D 3D 3D 3D 3D 3D 3D 3D 3D 3D 3D 3D 3D 3D
00000180  3D 3D 4A 30 1B 24 30 00 1B 54 69 64 65              ==.J0.$..Tide
00000190  64 65 74 65 72 67 65 6E 74 2D 37 32 20 2D 20 39 36 30  detergent-72 - 960
000001a0  32 37 2D 30 30 30 38 1B 4A 30 1B 24 30 00 2E 2E 31  27-0008.J0.$...1
000001b0  20 20 20 20 20 20 20 20 20 20 20 20 20 20 20 40            @
000001c0  20 20 20 20 20 20 20 20 20 24 36 2E 39 35 30           $6.950
000001d0  20 24 36 2E 39 35 1B 4A 30 1B 24 30 3D 3D 3D 3D   $6.95.J0.$====
000001e0  3D 3D 3D 3D 3D 3D 3D 3D 3D 3D 3D 3D 3D 3D 3D 3D
000001f0  3D 3D 3D 3D 3D 3D 3D 3D 3D 3D 3D 3D 3D 3D 3D 3D
```

RAW DATA

```
4E 3A 20 30 31 1B 4A 60 00 1B 24 60 00 1B 3D 3D 3D 3D  N: 01.J`..$`..====
```

EXAMPLE OF FILTERED OUT CONTROL CODES

---

Blackdust Design
www.blackdust.com
213-228-0020

INVOICE #36
Cash Purchase
DATETIME: 1/14/2009 10:35:56 AM
CASHIER: 01
STATION: 01
========================================
Tide detergent-72-96027-0008
1                           @    $6.950       $6.95
========================================
GRAND TOTAL                              $6.95
Amt Tendered                                 $10.00
Change due                                    $3.05
Cash Amount               $6.95
========================================

*FIG. 7B*

| Table - dbo.NaviitReceipt | | | |
|---|---|---|---|
| Receipt Id | Member Id | Purchase Time | Total |
| 1 | 3 | 1/22/2009 3:39:... | $7.4000 |

| Table - dbo.Na...ceiptLineDetail | Table - dbo.NaviitReceipt | | |
|---|---|---|---|
| ReceiptLineDet... | Receipt Id | Receiptmemid | Quantity | Amount | NoteGroupI |

| ReceiptLineDet... | Receipt Id | Receiptmemid | Quantity | Amount | NoteGroupI |
|---|---|---|---|---|---|
| 1 | 3 | 1 | 2 | 4.9500 | NULL |
| 2 | 3 | 2 | 2 | 4.9500 | NULL |
| 3 | 3 | 3 | 2 | 3.9500 | NULL |
| 4 | 3 | 4 | 2 | 3.9500 | NULL |

7) FINALLY(!!) the receipt is broken down into pieces with information that we care about.

| Table - dbo.Nav...DetailAttribute | Table - dbo.Na...ceiptLineDetail | | |
|---|---|---|---|
| ReceiptLineDet... | ReceiptLineDet... | AttributeName | Value | CreateDate |

| ReceiptLineDet... | ReceiptLineDet... | AttributeName | Value | CreateDate |
|---|---|---|---|---|
| 1 | 13 | SKU | 000340198863 | 1/22/2009 3:39:... |
| 2 | 14 | SKU | 028200162106 | 1/22/2009 3:39:... |
| 3 | 16 | SKU | 041689137564 | 1/22/2009 3:39:... |

POINT OF SALE NETWORK ROUTER

CROSS-REFERENCE TO RELATED APPLICATIONS

Not applicable.

STATEMENT REGARDING FEDERALLY SPONSORED R&D

Not applicable.

PARTIES OF JOINT RESEARCH AGREEMENT

Not applicable.

REFERENCE TO SEQUENCE LISTING, TABLE, OR COMPUTER PROGRAM LISTING

Not applicable.

BACKGROUND OF THE INVENTION

1. Field of the Invention

The present invention is related to routers, and in particular, to methods and systems for routing data from a point of sale device to a remote system.

2. Description of the Related Art

Conventional point of sale (POS) systems often include POS terminals (which may be a personal computer running POS software), printers, displays, keyboards and the like. Thus, many conventional POS systems necessitate the integration of different types of equipment from different manufacturers.

Many conventional point of sale systems include printers that provide printed paper receipts to evidence a transaction has taken place. For example, a receipt can act as evidence that a customer has purchased an item listed on the receipt at a given date, time, and location. The receipt can also include an indication as to what financial instrument was used to purchase the item (e.g., cash, credit card, gift card, etc.).

Certain receipts can be used in an item-return, where the customer is returning the item to the seller, and uses the receipt as evidence that the item was purchased by the customer from the seller. Receipts can be used for tax purposes (e.g., as evidence of a tax deductible purchase), and/or for reimbursement purposes (e.g., where an employee made a purchase in the course of their employment and uses the receipt as evidence that the purchase was made).

SUMMARY OF THE INVENTION

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Certain embodiments provide for the capture, storage, transmission, and access of electronic receipt data. Certain embodiments include a device configured to capture, store, and transmit purchase records electronically for access by purchasers and/or sellers.

Certain embodiments include a router device that can optionally be connected to a legacy point of sale terminal/system that does not support electronic receipts to thereby provide for electronic receipts.

The router device may be coupled to a communication port of the legacy system. The router device intercepts/receives printer data and commands, such as receipt data embedded with printer control codes, and enables the receipt data to be converted into an electronic receipt. The receipt data may be sent to a system, such as a remote server (e.g., a receipt management system), which may email the receipt to the customer and/or the seller, may make the receipt available via a network site, such as a web site. The receipt data is optionally pre-processed by the router device prior to sending the data to the system. This enables electronic receipts to supplement and/or replace physical receipts.

An example embodiment provides a receipt processing system, comprising: a first data port configured to be coupled to a point of sale terminal; a second data port configured to be coupled to a point of sale printer; a third data port configured to be coupled to a remote system; a computing device configured to: receive printer control codes and receipt data from the point of sale terminal via the first data port; transmit at least a portion of the receipt data to the remote system; provide the print printer control codes and receipt data to the point of sale printer via the second data port; and provide handshaking signals from the point of sale printer received via the second data port to the point of sale terminal via the first data port.

An example embodiment provides a receipt processing system, comprising: a first data port configured to be coupled to a printer port point of sale system; a second data port configured to be coupled to a remote system; a computing device configured to: receive, via the first data port, printer control codes and receipt data from the point of sale system printer port; and transmit at least a portion of the receipt data to the remote system.

An example embodiment provides a method of routing data, comprising: receiving via a first data port coupled to a point of sale system printer port: printer control codes for a printer, and receipt data corresponding to a purchase for a first user; and transmitting at least a portion of the receipt data to a receipt management system.

An example embodiment provides a method of upgrading a point of sale system, comprising: disconnecting a printer from a point of sale system; connecting the point of sale system to a first port of a print data interception device so that the print data interception will receive printer data, the printer data including and printer control codes and receipt data, transmitted by the point of sale system for use by the printer; and connecting the printer to a second port of the printer data interception device, wherein the print data interception device is configured to transmit at least a portion of printer data received from the point of sale system for processing and storage on a remote system, wherein at least one user can access at least a portion of the receipt print data electronically via the remote system.

An example embodiment provides a receipt management system, comprising: a computing device; instructions stored on non-transitory media, that when executed by the computing device, are configured to: receive printer information for a receipt corresponding to a purchase made by a purchaser, wherein the printer information includes: printer control codes; receipt data, the receipt data including: receipt variable data, including at least a currency amount; receipt label data associated with at least a portion of the receipt variable data; receive an identifier associated with the purchaser; identify an account associated with the purchaser; parse the printer information to identify receipt variable data; store at least a portion of the receipt variable data in a receipt database in association with the account associated with the purchaser; and provide access over a network to the stored receipt variable data to a user.

An example embodiment provides a receipt management system, comprising: a computing device; instructions stored on non-transitory media, that when executed by the computing device, are configured to: receive printer information for a receipt corresponding to a purchase made at a seller by a purchaser, wherein the printer information includes: printer control codes; receipt data, the receipt data including: receipt variable data, including at least a currency amount; receipt label data associated with at least a portion of the receipt variable data; identify an account associated with the seller; parse the printer information to identify receipt variable data; store at least a portion of the receipt variable data in a receipt database in association with the account associated with the seller; and provide access over a network to the stored receipt variable data to a user.

An example embodiment provides a method of processing data from a printer port: receiving printer information transmitted via a printer port for a receipt corresponding to a purchase made at a seller by a purchaser, wherein the printer information includes: printer control codes; receipt data, the receipt data including: receipt variable data, including at least a currency amount; receipt label data associated with at least a portion of the receipt variable data; identifying an account associated with the seller and/or identifying an account associated with the purchaser; parsing the printer information to identify receipt variable data; storing at least a portion of the receipt variable data in a receipt database in association with the account associated with the seller and/or in association with the account associated with the purchaser; and providing access over a network to the stored receipt variable data to a user.

An example embodiment provides an apparatus that includes a first data port configured to be coupled to a port, such as a printer port, of a point of sale system, a second data port configured to be coupled to a another system (which may be a remote system), an optional third data port configured to be coupled to a printer, and a computing device configured to receive, via the first data port, printer control codes and receipt data from the point of sale system port, transmit at least a portion of the receipt data to the remote system, and optionally transmit at least a portion of the printer control codes and receipt data to the printer.

BRIEF DESCRIPTION OF THE DRAWINGS

The disclosed aspects will hereinafter be described in conjunction with the appended drawings, provided to illustrate and not to limit the disclosed aspects, wherein like designations denote the elements.

FIG. 6 illustrates an example receipt.

FIGS. 7A-D illustrate an example printer data parsing process.

FIGS. 8A-B illustrate example consumer/customer user interfaces.

FIG. 9 illustrates an example merchant/business user interface.

DETAILED DESCRIPTION OF PREFERRED EMBODIMENTS

Figure 1A:
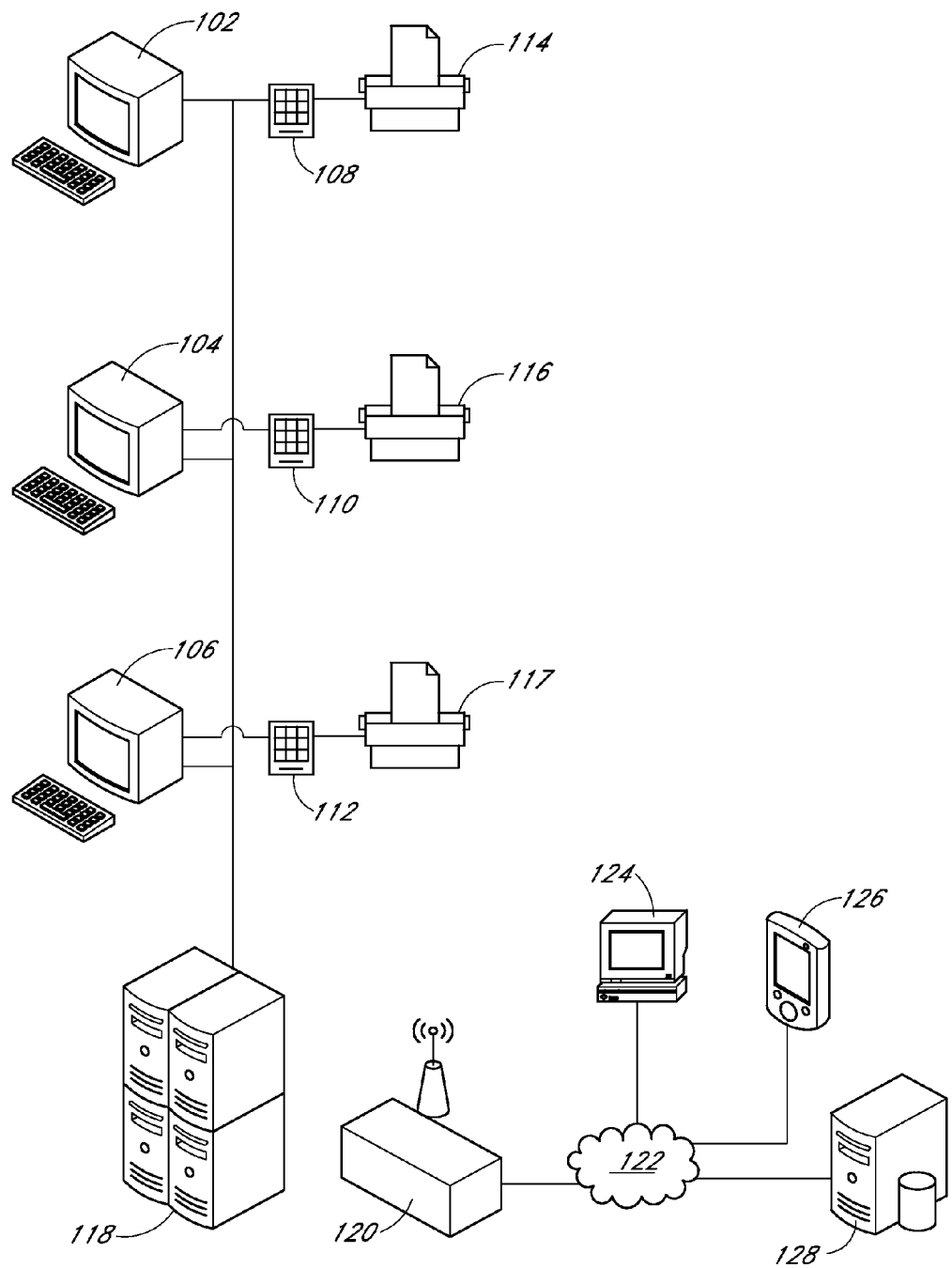
FIGS. 1A-1D illustrate example embodiments of point of sale systems, including example embodiments of routing devices.

Described herein are methods and systems for routing data from a point of sale terminal or terminals to another system. Certain embodiments include a device configured to capture, store, and transmit purchase records electronically for access by purchasers and/or sellers.

As will be described in greater detail below, certain embodiments include a router device that can optionally be connected to a legacy system that does not support electronic receipts. This enables electronic receipts to supplement and/or replace physical receipts, and optionally provides a gradual and convenient upgrade path for sellers (e.g., brick and mortar merchants selling goods or services).

The example router device may be coupled to a port, such as a printer port or other communication port of the legacy system (e.g., of a POS terminal, which may be in the form of a personal computer hosting POS software). The router device intercepts/receives receipt data, such as receipt data embedded with printer commands, and enables the receipt data to be converted into an electronic receipt. Examples of such printer commands (which may be in the form of control codes) are described in greater detail below. The receipt data may be sent to a system, such as a remote server (e.g., a receipt management system), which may email the receipt to the customer and/or the seller, and/or may make the receipt available via a network site, such as a web site. The receipt data is optionally pre-processed by the router device prior to sending the data to the system.

Thus, for example, at the time of a purchase, a user/customer provides identification data to identify themselves and to associate the receipt data with the user's account. Receipt data may then be relayed from the POS system, via the router device, to a service that parses the purchase information/receipt data into various elements (e.g., identifies printer commands, field names, and/or variable values). The customer is then provided access to electronic versions of their receipts in one or more formats and/or some or all of the receipt data. Optionally, merchants are also able to access receipt related data regarding purchases at their locations. Optionally, promotional messages and advertisements can be directed to a customer and/or merchant via electronic messages, physical receipts, and messages displayed on hardware devices at the point of sale. The selection of the promotional messages and advertisements provided to a given customer or merchant may be based, in whole or in part, on receipt data associated with the customer and/or merchant.

Example POS systems will now be discussed in greater detail. Many conventional point of sales (POS)/checkout systems are computerized, and include terminals, sometimes networked to a backend computer system. A POS system may be utilized to track and manage inventory, and process sales, including the printing of receipts. A POS terminal may be a computing device (e.g., with a processor, memory, input/output ports, etc.). A POS terminal may include user input devices, such as a keyboard, touch pad, mouse, trackball, bar code scanner, a card reader (e.g., a magnetic MICR card reader to read credit cards, prepaid cards, gift cards, membership cards, etc.), an RFID reader, etc. A POS terminal may include output devices, such as graphical displays for the operator, customer-facing graphical and/or character displays, speakers, beepers, and a receipt printer. A cash storage drawer with an electronic release is often included as well.

Because a POS system typically includes many different devices and peripherals, one challenge faced by POS system developers and users is the need to integrate of multiple types of equipment from different manufacturers. Analogously, many POS system component device manufacturers (e.g., of receipt printers) need to ensure that their components can work reliably with a variety of POS system and need to maintain such interoperability. Thus, such device manufacturers often provide authentication mechanisms that will prevent their software and/or hardware from working with unauthorized or non-verified devices.

As discussed above, conventionally, paper receipts, such as those from POS systems, have been used to evidence a transaction has taken place (e.g., an item/service purchase or return transaction). However, physical receipts, and conventional point of sales systems that print such physical receipts, suffer some many disadvantages.

For example, physical receipts can be easily misplaced, stolen, or destroyed. The loss of a physical receipt can hinder or prevent a user from obtaining a corresponding reimbursement, or from returning an item. Further, even when a physical receipt is not lost, it can be time consuming for a user to review and keep track of such physical receipts. Further, physical receipts are difficult to process and share (e.g., with respect to an employer processing receipts for reimbursement or an account reviewing and tracking receipts for purpose of tax preparation).

Still further, conventionally, when a user wants to electronically send a paper receipt, the user needs to first optically scan the receipt. Yet further, if the data printed on the receipt is to be entered into a computer database, either a person reading the physical receipt needs to manually type in the data from the physical receipt or a user needs to use an OCR (optical character recognition) program to convert the print data into electronic data understandable by a computer, which can be entered into the database.

Whether the data is manually entered by a person or via OCR, significant errors may be introduced and significant, time consuming, human intervention is typically needed. Further, it takes specialized equipment to optically scan a physical receipt. Yet further, physical receipts utilize natural resources in the making of the physical material of the receipts. Still further, merchants need to purchase specialized printers capable of printing rapidly, reliably, and in a compact area. The material for the physical receipts (e.g., credit card slips, paper roles, thermal paper roles, etc.) needs to be ordered and kept in inventory. Customers often discard physical receipts on streets and sidewalks, adding to the burden on maintaining the cleanliness of such streets and sidewalks, and adding to pollution, particularly in the case of thermal paper.

Certain embodiments may be used to address some or all of the disadvantages of conventional paper receipt systems discussed above. However, it is to be understood that not all of foregoing disadvantages need be addressed. For example, certain embodiments provide electronic receipts without providing a paper, hardcopy receipt at the point of sale terminal. Other embodiments provide both electronic and paper receipts.

One challenge merchants have faced in utilizing electronic receipts is that a large percentage of merchants have legacy system that do not support electronic receipts. Further, the point of sales system market is fragmented in that there is large numbers of suppliers/manufactures of point of sales systems, each providing a unique solution. Therefore, a purely software solution of enabling a large number of these legacy systems from various manufacturers to provide electronic receipts has proven impractical, as a custom software solution would need to be developed for each unique system type. Further, installing software solutions can be time consuming, mistake-prone, and unreliable, and often requires someone with technical expertise to perform the installation.

In order to overcome the foregoing challenges, certain embodiments described herein enable legacy point of sales systems that do not provide or support electronic receipts to be upgraded to provide electronic receipts, without requiring that new software be installed on the POS terminals. Certain embodiments further do not require new software to be installed on the legacy POS system backend. Thus, for example, certain embodiments of the router device can be utilized with POS terminals, printers, and systems, for a variety of different suppliers and manufacturers, without having to customize the router device for a given POS manufacture's or supplier's equipment.

For example, certain embodiments include a receipt data router device that includes a print data interceptor device that is configured to be coupled to receive data from a POS terminal port, such as via a printer port. The interceptor device may sit between the POS terminal printer port and a receipt printer and coupled to both, thereby receiving raw receipt data from the POS terminal and forwarding the data to the receipt printer (via a wired or wireless connection). Optionally, the interceptor device may be connected as a tap on the connected (wired or wireless) between the POS terminal and the receipt printer, without having to forward the printer data to the printer.

With respect to the raw printer data, the raw data may have been formatted by the POS terminal as a combination of printer commands (e.g., setting the font size, moving the paper, etc.) and receipt data for the receipt printer connected to the POS terminal. For example, the data stream from the POS terminal may include receipt data providing relevant data regarding a purchase transaction, interleaved with special printer formatting commands.

By way of illustration, a number of manufactures make POS printers. Certain of these printers use special POS printer command codes, such as POS printer control codes, which may be manufacturer specified codes or may be codes defined by a standards body.

If the stream of data directed to the printer would be interpreted as ASCII character data, the ASCII data would only be partially meaningful/understandable to a human reader. Conventionally, the stream of data is interpreted by firmware on the printer device and translated into a physical receipt that is includes the receipt data that is intended to be human readable (e.g., the name of the purchased item, the price, the date of the purchase, the tax, etc.).

In an example embodiment, the receipt data router device also includes a port, such as a telephone modem, via which the device is coupled to a network, such as a telephone network (e.g., by dialing a dial-up access number). The receipt data router device is configured to transmit via the network port the printer data, either in raw form (including the printer control codes and the receipt data) or in a processed form (e.g., with the printer command data stripped out), to a remote receipt management system, which may also be configured as a server.

In certain embodiments, certain components of the receipt data router device is divided into separately housed devices. For example, in one embodiment, the receipt data router device includes one or more print data interceptor devices and a network communication device. By way of illustration, for a given installation, there may be multiple print data interceptor devices connected to corresponding legacy POS terminals (e.g., wherein a POS terminal and associated print data interceptor device are located in a given checkout lane). The print data interceptor devices may be wirelessly via a wired or wireless connection (e.g., a WiFi or other RF network) to the network communication device. The print data interceptor devices forward some or all of the receipt printer data they receive to the communication device, and the communication device (connected via a phone, Ethernet or other port) forward the information to a remote system. This technique allows the print data interceptor devices to be made at a lower cost as, rather than having each print data interceptor device include a phone modem or the like, multiple print data interceptor devices can share such a modem, which is located in the communication device.

Optionally, the communication device can also process the receipt printer data (e.g., by stripping out printer commands) prior to forwarding the data to the remote system. Optionally, however, a print data interceptor device does include or is coupled to its own modem, which may in turn be connected to a communications network.

In an example embodiment, the receipt data router device and/or a remote system processes the raw receipt printer data into human readable form and/or as well-structured data that is suitable for machine understanding and ease of indexing and searching.

An example process (executed by the remote system and/or the print data interceptor) traverses through the raw receipt printer data stream and removes printer-specific commands. For example, for a receipt that was received from a printer driver (that may optionally use company-specific (e.g., proprietary) and/or standardized printer command codes, such as formatting commands) on the POS terminal, the process, configured to recognize such printer formatting commands, removes or filters out the printer formatting commands. The remaining data, (e.g., the receipt data that was intended to be printed for human reading), is formatted by the process to be readable to a human reader (e.g., as ASCII formatted data).

In addition, an example process breaks down the cleaned receipt printer data into well-structured data, to facilitate automated operations such as search, categorizing, and indexing.

The formatting can be automated based on parsing and "understanding" the receipt text and/or on the location of the text. For example, the formatting of receipts often follow a predictable pattern, where the information positioned towards the top of a receipt includes information about the merchant/store, such as name, address, telephone. The information positioned towards the middle portion of the receipt typically includes a list of purchased items with itemized costs, and additional metadata, such as SKU numbers and/or discounts. The information positioned towards the bottom portion of the receipt typically includes subtotals, taxes, total amount, and transaction tendering information.

Thus, for example, a rules-based engine, such as regular expressions, is optionally employed, which uses known formatting data for a given receipt style to parse the receipt data into different parts. Regular expressions provide an efficient and flexible technique for identifying strings of text, such as particular characters, words, or patterns of characters. A regular expression may be written in a formal language that can be interpreted by a regular expression processor program that serves as a parser generator and/or examines text and identifies parts that match the provided specification. A regular expression may include constants and operators that denote sets of strings and operations over these sets.

The rules-based engine optionally enables the process to search, categorize, and perform analytics against the purchase information. For example, a merchant, customer, or other entity that has access to receipt data for a given customer or merchant can query how much customer is spending, over a selected period of time or overall, on a particular category of goods, such as groceries, restaurants, clothing, movies, etc.

The specific format and layout of a receipt may be determined by the point of sale software being used (e.g. proprietary POS software from one or more entities) and/or end-user/merchant configurable settings. The formatting information may be user specified. For example, a merchant can specify (e.g., via a web-based administrative site hosted by the remote system that will perform the parsing), what POS software is deployed within the merchant's stores. By knowing what POS software is deployed and the settings configuration, the process can determine the receipt format and layout.

Optionally, if an authoritative declaration of the POS software has not been provided to the parser, an example process performs an iterative estimation of which receipt data parser can process a given data stream with the most or a certain level of certainty.

Receipt data may include field names (e.g., "tax", "total", etc.) and variable values (e.g., the actual tax amount that is to be printed on the receipt, the total amount to be printed on the receipt, etc.). Example types of receipt data are described below, although a given receipt can include less or more types of information:

Merchant data: Merchant name, address of store where purchase was made, and/or merchant phone number;

Transaction data: Identifier of sales person; date of transaction, code identifying the store, code identifying the register/POS terminal used in the transaction, item data (e.g., UPC code, textual description, list price, actual sales price, quantity, total costs for a given item (item price*quantity), savings ((list price*quantity)−(item price*quantity));

Sales summary: subtotal, sales tax, total for the sale (total=subtotal+sales tax)

Payment data: Account number, credit/debit card type, card expiration date, approval code, merchant code, amount paid in cash;

Customer data: customer identifier

Marketing profile, rewards offer data: discount coupon;

Internet transaction data: transaction identifier, authorization code

The receipt data can be stored in a database, where the different pieces of data are mapped to corresponding fields. For example, the store name can be mapped to a store name field, a purchased item name can be mapped to a purchased item field, an item price can be mapped to an item price field, a tax can be mapped to a tax field, a total can be mapped to a total field, etc. Thus, in this example embodiment, the receipt data can be received, analyzed, and stored, without the merchant, customer, or other entity, optically scanning a physical receipt and without having to perform an optical character recognition (OCR) process. Thus, in certain optional embodiments, a physical receipt is not optically scanned and an OCR process is not performed with respect to the physical receipt.

The receipt data can then be presented to a user (e.g., the customer, merchant, and/or other authorized party) via user interface provided via a terminal. Different types of data may be displayed to different types of users. For example, a user may be able to access and view some or all of the data in a table and/or graph format via a website over the Internet via a browser hosted on a user computing device (e.g., a personal computer, browser-enabled phone, networked television, etc.) or via an application (e.g., a phone app) loaded onto a computing device such as a phone. Optionally, the website enables the user to add metadata with respect to the presented data. For example, the user is optionally able to categorize and annotate receipt data, at the receipt and/or receipt line item levels. This user generated metadata is optionally also stored in the database in association with the receipt data and/or user to account for later recall and querying.

Optionally, the website or app are configured to enable the user to query statistical information across all or selected portions of the receipt data for a given customer, merchant, and/or particular store. For example, optionally, automated personal finance tools are provided via which information, which may include charts (e.g., pie charts, bar charts, etc.) to illustrate/chart how a customer's purchases fall into distinct categories. For example, the charting can provide a user, such as a consumer, with purchase information broken down into such categories as automotive, dining, grocery, entertainment, housing expenses, etc. Optionally, the system likewise enables merchants to display, query, and generate reports that summarize purchase information on a store by store basis, for all stores, etc. The consumer can be provided aggregated information on their spending habits, optionally over a selected period of times. Similarly, a merchant can view who are their better customers, how much they spend over a given period of time, and what types of items they are spending their money on.

Optionally, the user can specify that certain notifications should be sent to the user (e.g., via email, SMS/text messaging, and/or via phone, etc.) upon the occurrence of certain events or conditions. For example, the user can be notified each time a new receipt is received, when specified spending thresholds have been reached or exceeded, when discounts or special offers are being made available, and/or when summary reports have been generated. Optionally, the notification can include some or all of the data relating to the event that caused the notification (e.g., a copy of a receipt or discount coupon).

Optionally, customers can sign up for the customer services described herein at a merchant, via a website, or otherwise. Optionally, a customer can choose to pre-register for the services at the point-of-sale. The POS terminal or other device can provide the customer with a digital receipt. The customer then confirms and finalizes the registration. This permits the customer to access, online at a later date, their first digital receipt from the merchant where the customer pre-registered. Optionally, the customer can retrieve their pre-registration account information by providing an identifier that the customer used in the purchase, such as a phone number or credit card number.

In addition to receipt data provided via the routing device discussed above, the receipt management system is optionally configured to accept, store, and process electronic receipts from online transaction and from newer POS systems, located at bricks and mortar stores, that are configured to provide such electronic receipts without the need for the interceptor device described above. Still further, optionally the receipt management system is configured to accept, store, and process images of physical receipts (e.g., optical scans of physical receipts using a flatbed scanner, a camera phone, a web camera, etc.) and to perform OCR on the images, and to parse the data as similarly discussed herein with respect to the receipt data received from the routing device. Optionally, the system further provides online forms via which a user (merchant or customer) can manually enter receipt data (e.g., via a computer). For example, the form can include fields to receive some or all of the receipt data discussed herein.

Optionally, users may be charged a fee for using some or all of the services provided by the receipt management system. Optionally, in addition or instead, the services may be supported by advertising. The advertising may be targeted and customized for a given customer based on their purchase information and spending habits as determined from the customer's receipts stored on the receipt management system. Optionally, certain customers that pay an additional fee or are otherwise considered to be premium customers will not be provided with advertising or may be provided with less advertising relative to other, non-premium customers.

Merchants may be charged a flat fee (e.g., a flat periodic fee, such as a monthly or yearly fee) and/or fees based on their usage (e.g., the number of receipts over a given time period received from the merchant and/or the number of routing devices or printer interceptor devices provided to the merchants). The routing devices may be provided free to the merchant, leased to the merchant for a periodic fee, or sold outright to the merchant for a flat fee. Optionally, in addition or instead, the merchant services may be supported in whole or in part by advertising. The advertising may be targeted and customized for a given merchant based on a profile for the merchant. For example, the profile may optionally be generated, at least in part, using an online form filled in by the merchant, including information on the items sold by the merchant, the location of the merchant's store(s), the amount of sales overall and/or on a per store basis, etc.).

The merchant profile may also be automatically generated, in whole or in part, by the system, where, for example, the system examines the merchant's customer receipts stored on the system, and identifies items sold by the merchant from item listings on the customer receipts. The merchant profile may also be generated, in whole or in part, on other customer information, including customer profiles, purchase information, and spending habits as determined from the customer receipts stored on the receipt management system. Optionally, certain merchants that pay an additional fee or are otherwise considered to be premium merchants will not be provided with advertising or may be provided with less advertising relative to other, non-premium merchants.

Optionally, marketing entities may also obtain receipt-based information from the system (e.g., transmitted by the system to the marketing entities). Optionally, the information will not include such sensitive items as credit card numbers, debit card numbers, customer addresses, customer phone numbers, and/or customer names to thereby protect customer privacy.

As previously discussed, an example embodiment of the router device intercepts receipt data from the POS terminal. Optionally, the router device also incorporates some or all of the POS terminal functionality and/or other functionality. For example, the router device may include a keyboard for manually entering data (such as an identification of the item purchased, a price, customer identification information, etc.), a card reader for reading payment cards and membership/loyalty cards (e.g., to obtain related discounts, purchase points, etc.), a display for displaying data being entered via the keyboard and/or other data/instructions, a scanner for scanning bar codes or RFID devices for the items being purchased, and/or a biometric reader to authenticate the customer.

Certain example embodiments will now be described with respect to the figures.

FIG. 1A illustrates an example POS system configuration including an example embodiment of a POS receipt data routing device. The POS system includes multiple POS terminals 102, 104, 106 which may include some or all of the features discussed above (e.g. user input devices, a card reader, a display for the operator, a display for the customer, a speaker (e.g., to provide voice prompts or notifications), a beeper, a printer port, a cash storage drawer, etc.), and/or other features. A given POS terminal may be located at a corresponding checkout lane. The POS terminals 102, 104, 106 are coupled to respective print data interceptor devices 108, 110, 112 via respective communication ports, (e.g., a parallel port, such as a IEEE 1284 compatible port, a serial port, such as a RS-232 or RS-485 compatible port, a USB port, a wireless USB port, an Ethernet port, etc.).

Thus, in this embodiment the POS terminal and the print data interceptor device include communication ports via which they can communicate with each other. The print data interceptor devices 108, 110, 112 may include some or all of the features discussed above (e.g., a keyboard, a card reader, a display, a scanner for scanning bar codes, a scanner for scanning/reading RFID, a biometric reader, wired and/or wireless communication ports (e.g., a parallel port, such as a IEEE 1284 compatible port, a serial port, such as a RS-232 port or RS-485 compatible port, an Ethernet port, a USB port, a wireless USB port, a WiFi port, such as an IEEE 802.11 port, etc.), etc.).

The print data interceptor devices 108, 110, 112 are coupled via respective print data interceptor device ports to ports on respective printers 114, 116, 117 (e.g., to a printer parallel port, such as a IEEE 1284 compatible port, a serial port, such as a RS-232 port or RS-485 compatible, an Ethernet port, a USB port, a wireless USB port, a WiFi port, such as an IEEE 802.11 port, etc.). Optionally, the POS terminal port, the print data interceptor device port, and the printer port that are used in the interconnections described above are all of the same port type (e.g., all the connections are made using a parallel port or a serial port).

The POS terminals, 102, 104, 106 are coupled via a wired or wireless network (e.g., via an Ethernet or WiFi network) to a POS server system 118. The server system 118 may provide a variety of POS functions, such as inventory control, payment processing, reservations, bookkeeping, tracking of customer purchase histories, reporting of the foregoing, etc.

The print data interceptor devices 108, 110, 112 are connected to a network communications device 120. In this example, the print data interceptor devices 108, 110, 112 are connected to a communications device 120 via a wireless connection (e.g., via an IEEE 802.11 or cellular network). However, in addition or instead, the print data interceptor devices 108, 110, 112 are connected to a communications device 120 via a wired connection (e.g., via a parallel port, such as a IEEE 1284 compatible port, a serial port, such as a RS-232 port or RS-485 compatible, a USB port, an Ethernet port, etc). The communication device 120 is connected to a system 128 (e.g., including a server device) configured to manage the electronic receipts. For example, the electronic receipts management system 128 can be connected to the communication device 120 via a local area network or via a wide area network (WAN) 122, such as the Internet. For example, the communication device 128 can include a DSL, cable, or telephone modem (e.g., which connects to the network by calling an access number).

As similarly discussed above, the print data interceptor devices 108, 110, 112 receive printer data, including receipt data and printer commands, from respective POS terminals 102, 104, 106. The print data interceptor devices 108, 110, 112 then forward the printer data (optionally in raw form or in a processed form, such as with the printer commands stripped out) to the communication device 120. The communication device 120 then forwards the printer data (optionally in raw form or in a processed form, such as with the printer commands stripped out) to the electronic receipts management system 128. The electronic receipts management system 128 is configured to perform some or all of the parsing, organizing, reporting, and/or displaying functions described herein.

For example, the electronic receipts management system 128 can execute the processes discussed herein, including examining printer data, and identifying and removing printer-specific commands (e.g., company-specific (e.g., proprietary) and/or standardized printer command codes, such as printer formatting commands). In addition, the electronic receipts management system 128 parses, optionally using the rules based engine discussed herein, and processes the receipt printer data into well-structured data, to facilitate automated operations such as search, categorizing, and indexing.

The electronic receipts management system 128 additionally provides user access to receipt data. Different users may be granted different permissions based on their permission profile. The permissions may be determined from the user's login information, which is optionally used by the system to access a corresponding user record which indicates the user's permissions.

For example, a customer may be granted access to view the customer's receipts, including the customer's receipts at a variety of merchants at which the customer made a purchase (e.g., where the merchants are configured to forward electronic versions of the customer's receipts to the electronic receipts management system 128) and analytics thereof (e.g., the statistical information, categorizations, and graphical displays discussed above). The customer may access a website hosted by the electronic receipts management system 128 or other system via a customer terminal 126.

By way of further example, a merchant may be granted access to view receipts from purchases made at the merchant's stores and analytics thereof (e.g., the statistical information, categorizations, and graphical displays discussed above) via a merchant terminal 124. By way of further example, a user may be able to access receipt data and analytics via an app hosted on a phone or other computing device.

While the routing device illustrated in FIG. 1A utilizes a separate communication device 120 via which a plurality of interceptor devices 102, 104, 106 communicate with the electronic receipts management system 128, optionally, one or more of the interceptor devices 102, 104, 106 may include an integral modem via which they can access the electronic receipts management system 128 over the network 122.

Figure 1B:
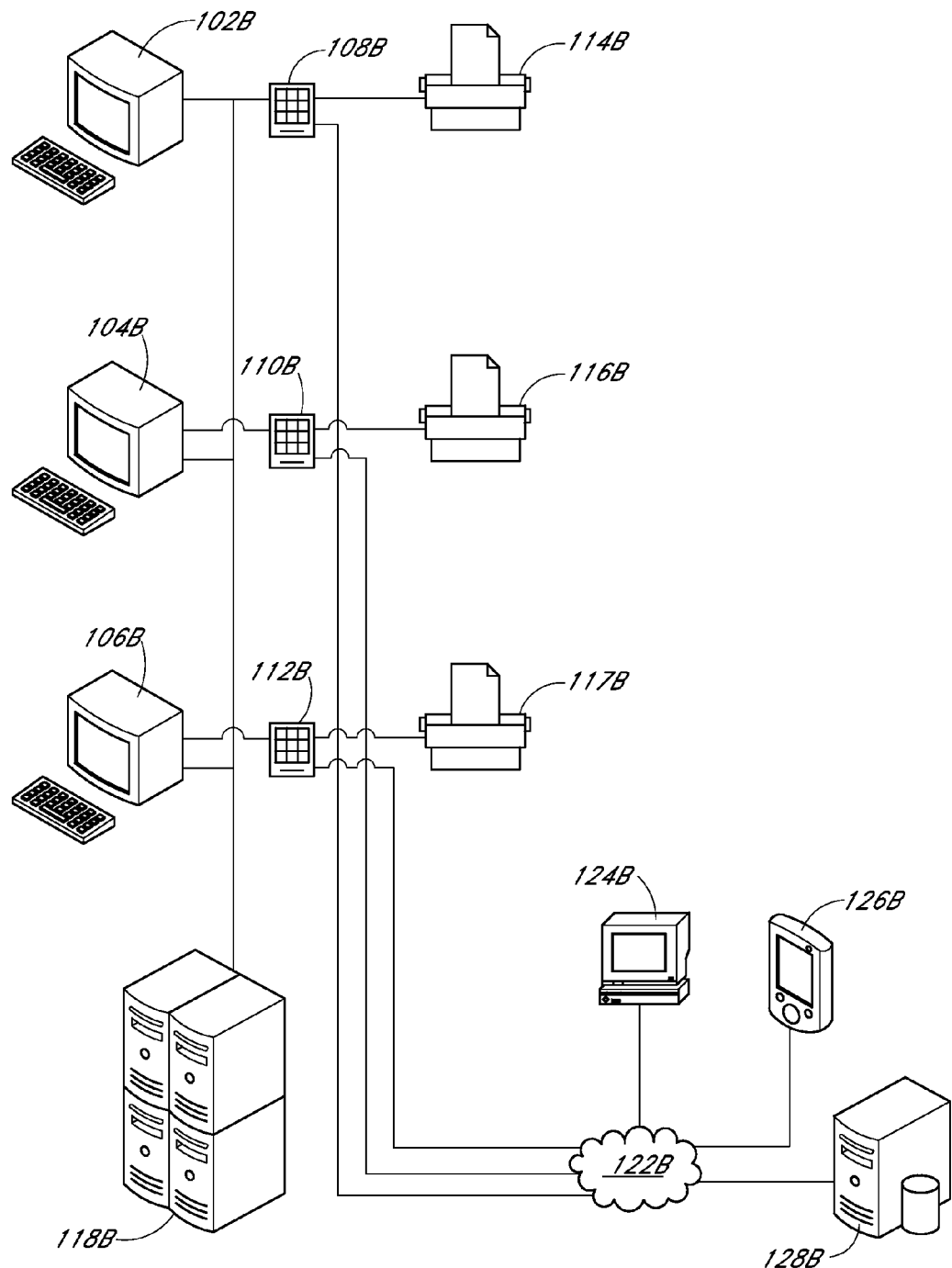

For example, FIG. 1B illustrates an example POS system configuration including an example embodiment of a POS receipt data routing device. In this example, the router devices 108B, 110B, 112B, include both the interceptor device and network communication interface that provides access to the Internet (or other network). The POS system includes multiple POS terminals 102B, 104B, 106B which may include some or all of the features discussed above (e.g. user input devices, a card reader, a display for the operator, a display for the customer, a speaker, a beeper, a printer port, a cash storage drawer, etc.), and/or other features. As similarly described above, a given POS terminal may be located at a corresponding checkout lane. The POS terminals 102B, 104B, 106B are coupled to respective router devices 108B, 110B, 112B via respective communication ports, (e.g., a parallel port, such as a IEEE 1284 compatible port, a serial port, such as a RS-232 or RS-485 compatible port, a USB port, a wireless USB port, an Ethernet port, etc.). Thus, the POS terminal and a given router device include communication ports via which they can communicate with each other.

The router devices 108B, 110B, 112B may include some or all of the features discussed above (e.g., data interceptor device, network modem, a keyboard, a card reader, a display, a scanner for scanning bar codes, a scanner for scanning/reading RFID, a biometric reader, wired and/or wireless communication ports (e.g., a parallel port, such as a IEEE 1284 compatible port, a serial port, such as a RS-232 port or RS-485 compatible port, an Ethernet port, a USB port, a wireless USB port, a WiFi port, such as an IEEE 802.11 port, etc.), etc.). The router devices 108B, 110B, 112B are coupled via a print data interceptor device port to a port on respective printers 114B, 116B, 117B (e.g., to a printer parallel port, such as a IEEE 1284 compatible port, a serial port, such as a RS-232 port or RS-485 compatible, an Ethernet port, a USB port, a wireless USB port, a WiFi port, such as an IEEE 802.11 port, etc.). Optionally, the POS terminal port, the print data interceptor device port, and the printer port that are used in the interconnections described above are all of the same port type (e.g., all the connections are made using a parallel port or a serial port).

The POS terminals, 102B, 104B, 106B are coupled via a wired or wireless network (e.g., via an Ethernet or WiFi network) to a POS server system 118B. The server system 118B may provide a variety of POS functions, such as inventory control, payment processing, reservations, book keeping, tracking of customer purchase histories, reporting of the foregoing, etc.

The router devices 108B, 110B, 112B include integral modems directly connected to a network (e.g., a PSTN or other network), without the use of the shared network communication device discussed above with respect to FIG. 1.

In other optional embodiments, all or portions of the routing device (e.g., the interception device and/or the communication device) are integrated into the same housing as the printer. Optionally, some or all of the user interface devices (e.g., keyboard, display, card reader, RFID reader, biometric readers, and/or user interface devices discussed herein) can be housed separately from the interceptor device and/or the communication device, but are coupled (e.g. via a cable or wireless) to communicate with one or more other portions of the routing device. Optionally, the routing device can include additional devices, such as a signature pad to capture a customer's signature, biometric sensors (e.g., fingerprint, hand scanner, retinal scanner, microphone), to scan a customer's fingerprint, hand, retina, and/or voice for authentication purposes.

Figure 1C:
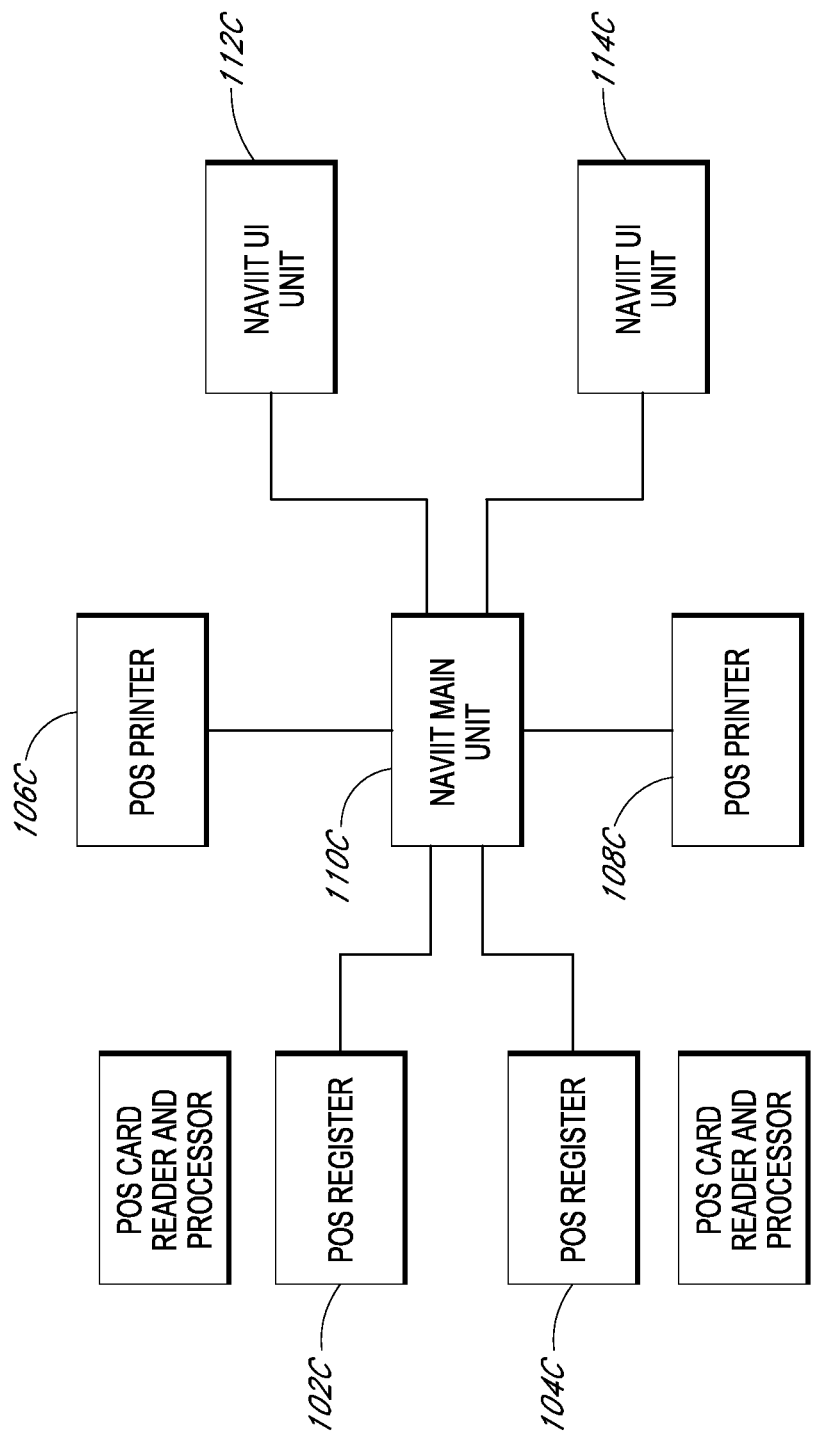

FIG. 1C illustrates another embodiment. In this embodiment, multiple registers 102C, 104C, point of sale receipt printers 106C, 108C, and user interface devices 112C, 114C, are coupled to, and share, a single interceptor device and network communication device 110C.

Figure 1D:
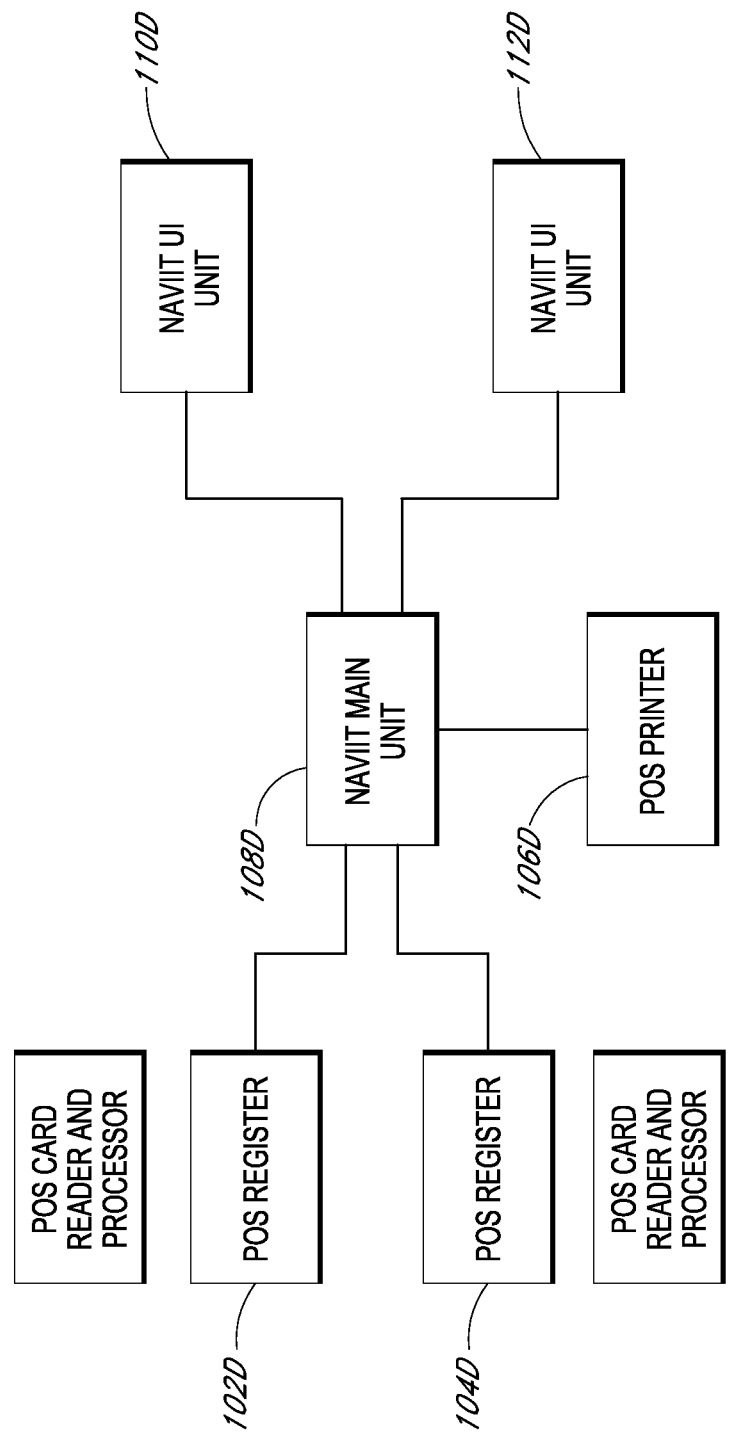

FIG. 1D illustrates another embodiment. In this embodiment, multiple registers 102D, 104D, and user interface devices 110D, 112D are coupled to, and share, a single print data interceptor device and communication device 108D. In this embodiment, there are fewer point of sale printers than there are point of sale terminals. For example, several point of sale terminals may share a single point of sale printer 106D. Thus, because multiple POS terminals can share a printer, the cost associated with purchasing printers is reduced, and the space that needs to be allocated to printers is likewise reduced.

For example, for printers that have multiple printer ports, a separate cable/wireless interface can be used to connect a given printer port to the device 108D, wherein a given cable is reserved for communications (data and commands) with a single point of sale terminal. In other words, there may be multiple printer cables/connections between the device 108D and the printer 106D, where each printer cable/connection corresponds to a given POS terminal. Optionally instead, data and print commands from multiple point of sale terminals can be transmitted (e.g., multiplexed) over a single cable/wireless interface to the same printer.

Example embodiments of the router device will now be discussed in greater detail.

Figure 1E:
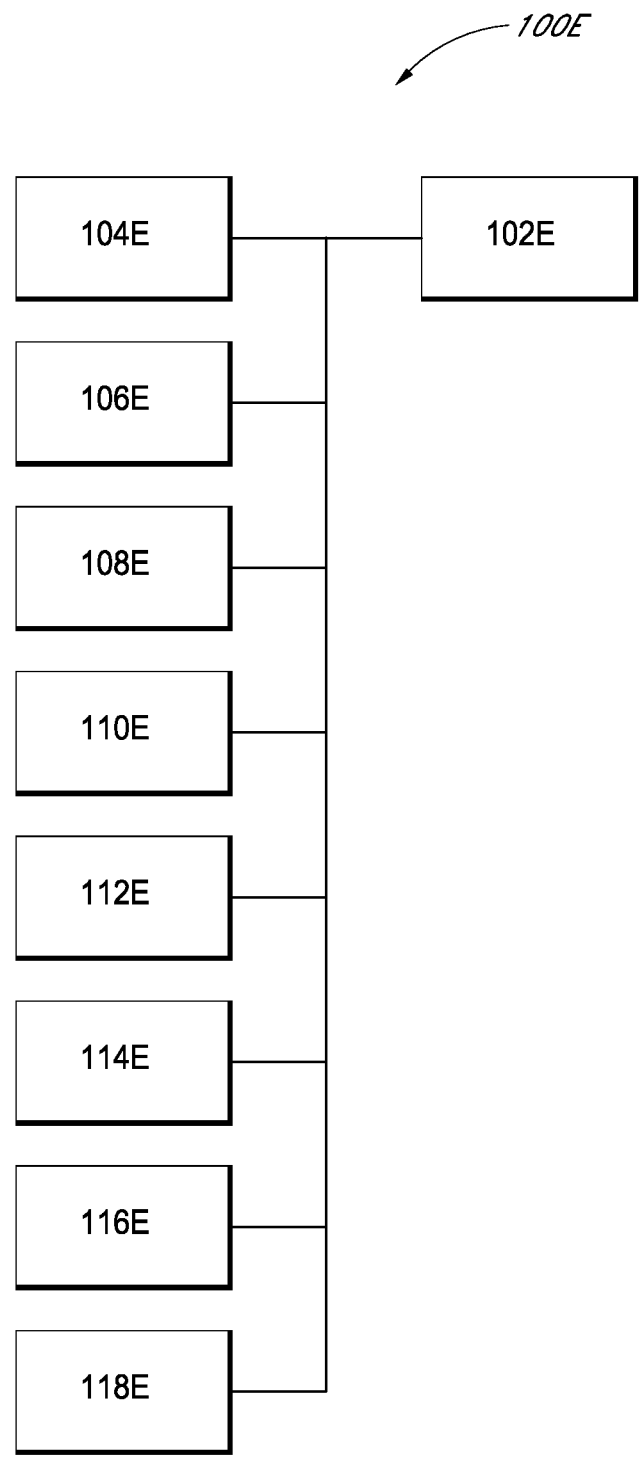
FIGS. 1E, 1F illustrate example embodiments of routing devices in greater detail.

FIG. 1E illustrates an example embodiment of the router device 100E. In this example, a processor 102E, which may be in the form of a general purpose processor, a microcontroller, or other device, is coupled to non-volatile memory 104E (e.g., ROM, EEPROM, Flash Memory, or other non-volatile memory). The non-volatile memory 104E may be used to store program code used to implement processes described herein. In addition, the processor 102E is coupled to volatile memory 106E (e.g., RAM), which is used as working memory (e.g., to store variable values, data received from the POS system/terminal, etc.).

The processor 102E is also coupled to one or more ports 108E, which are intended to be coupled to a POS terminal printer port and to a POS printer. In addition, the processor 102E is coupled to a modem 110E (e.g., a telephone modem, a DSL modem, a cable modem, an Ethernet interface, etc.), which is configured to be coupled over a network (e.g., a telephone network, a data network, etc.). This embodiment includes an optional card reader 112E, data entry device 114E (e.g., a keypad), a display 116E, and a barcode scanner 118E. The router device 100E optionally includes an integral printer (e.g., which could be used to print receipts).

Figure 1F:
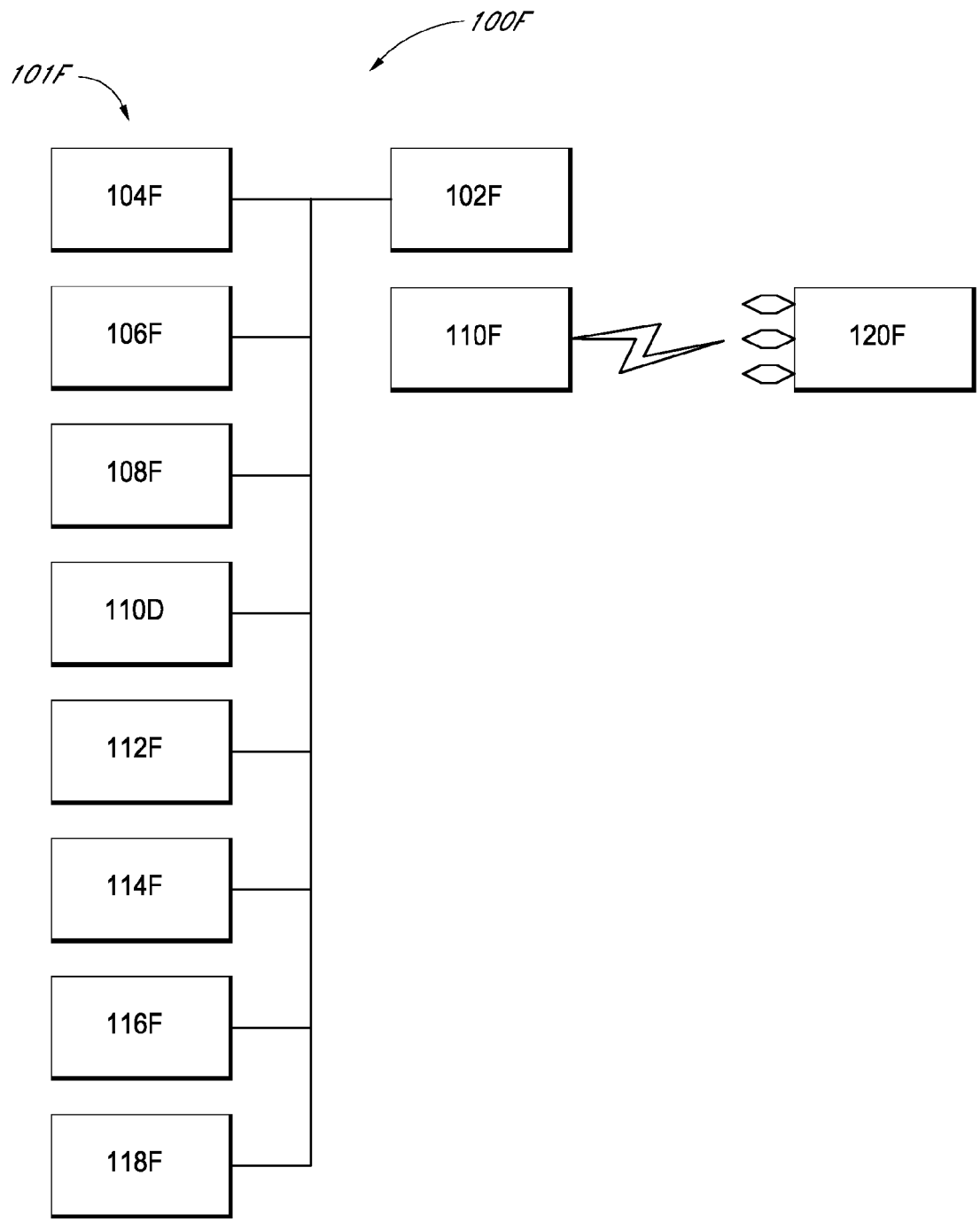

FIG. 1F illustrates an example embodiment of the router device 100F divided into two separated units, a print data interceptor device 101F and a network communication device 120F. In this example, a processor 102F, which may be in the form of a microcontroller, is coupled to non-volatile memory 104F (e.g., ROM, EEPROM, Flash Memory, or other non-volatile memory). The non-volatile memory 104F may be used to store program code used to implement processes described herein. In addition, the processor 102F is coupled to volatile memory 106F (e.g., RAM), which is used as working memory (e.g., to store variable values, data received from the POS system/terminal, etc.). The processor 102F is also coupled to one or more communication ports 108F, which are intended to be coupled to a POS terminal printer port and to a POS printer. This embodiment includes an optional card reader 112E, data entry device 114F (e.g., a keypad), a display 116F, and a barcode scanner 118F. The print data interceptor device 101F optionally includes an integral printer (e.g., which could be used to print receipts).

In addition, the processor 102F is coupled to a communication port (e.g., a wireless port or a port for a wired interface, such as a cellular interface port, a WiFi interface port, etc.), which is configured to be coupled to the communication device 120F. The communication device 120F is configured to be coupled to one or more receipt interceptor devices via one or more communication ports. In addition, the communication device 120F includes one or more modems (e.g., a telephone modem, a cellular modem, an Ethernet modem, etc.) via which the communication device 120F can communicate with a remote system (e.g., a receipt management system).

The router device's optional features facilitate user interaction and authentication. For example, the device is optionally configured to use the display to display data and menu options to the customer and/or the cashier. In addition, certain of the devices input devices (e.g., card reader, numeric keypad, alpha number keypad, RFID reader, etc.) can be used to enable customers to register to participate in the electronic receipt service, to identify themselves, to select receipt printing options, and/or to select receipt delivery options.

By way of example, the device displays to a user information and/or prompts. By way of illustration, the device may display "ready for receipt" or the like prior to the printing of the receipt. Upon receiving receipt data from the POS terminal, the device may display a prompt "enter phone number" to prompt the user to enter their phone number as an identifier. As similarly discussed above, the user's credit card, driver's license, loyalty card, or the like can be run through the card reader to identify the user and/or for payment.

Optionally, the router device can take photographs, scan photographs (e.g., from the user's identification card), scan (e.g., from the user's identification card) or capture the customer's signatures, record the customer's voice, and automatically compare some or all of the foregoing to corresponding recorded identification information, and verify whether there is or is not a match. Optionally, the router device may display a computer generated image of the receipt that appears similar to or the same as a printed receipt.

Optionally (e.g., for operating environments in which on-device memory resources are scarce), the router device breaks down raw receipt data into smaller packets/chunks of data (e.g., about 1 kbytes or other size) that are transmitted sequentially to the remote system once the router device established a connection with the remote system (e.g., an Internet connection). For example, the chunks may optionally be sized to be suitable for HTTP-based service calls. The sub-packets of receipts are queued and collated when the needed packets have been received by the remote system.

Figure 2:
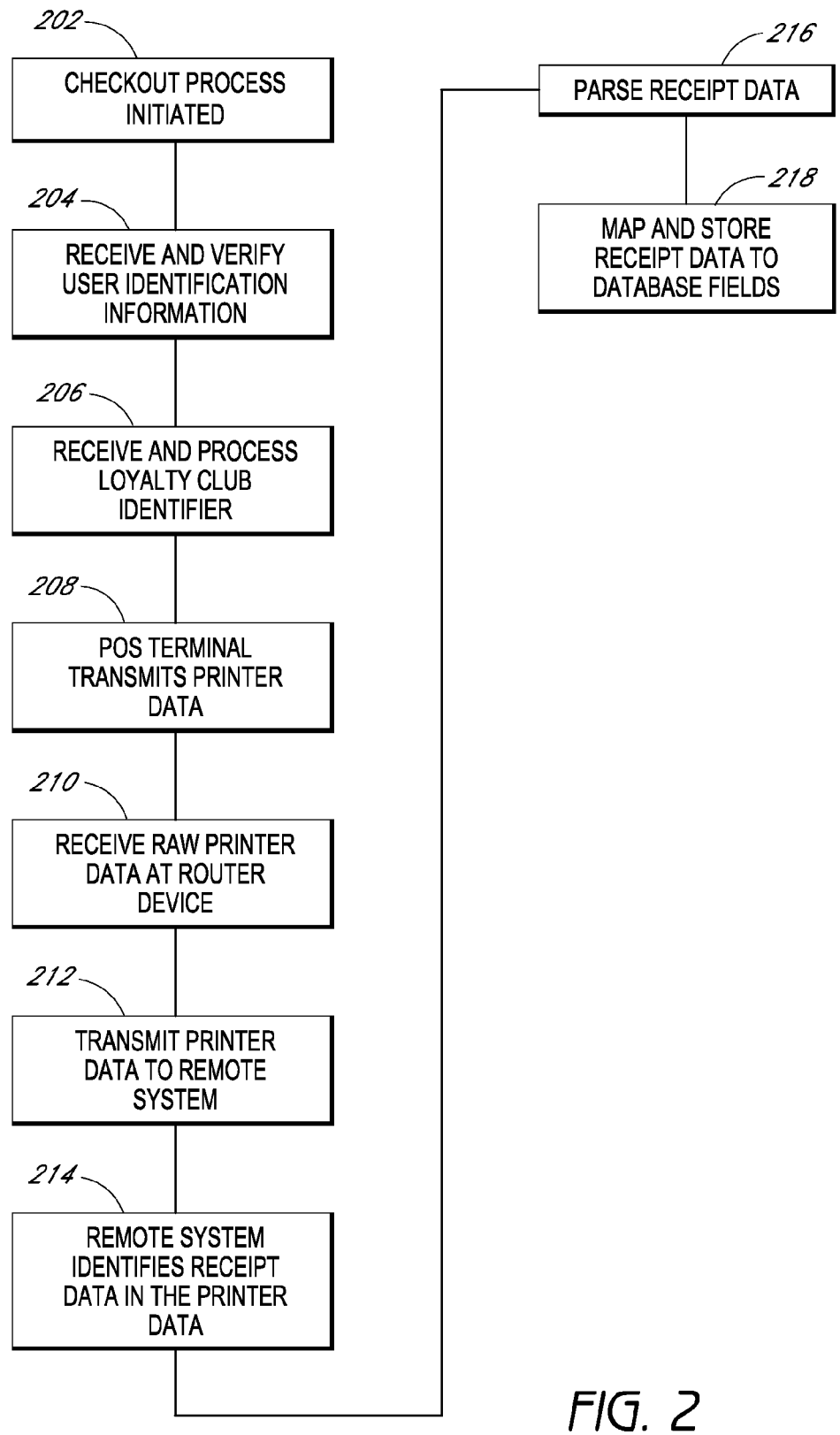
FIG. 2 illustrates an example check-out process utilizing a routing device.

FIG. 2 illustrates an example checkout process. At state 202, a customer begins a check out process at a merchant. A point of sale terminal operator (e.g., a cashier) scans a code (e.g., a UPC code) from the item being purchased to obtain item identification information. The item identification information is then used by the POS system to obtain pricing information for the item from a pricing database. Optionally, the terminal operator (e.g., checkout person or the customer) can manually enter the item identification and price via a user input device (e.g., a keyboard including physical screen, a touchpad, a touch sensitive display). At state 204, the customer provides customer identification and payment in the form of cash, a credit card, a debit card, a gift card or otherwise. For example, if payment is made by credit card, the customer's card may be swiped or otherwise read via a card reader (which may be part of the legacy POS equipment or may be included in the interception device), and the payment is processed via the POS system. The payment instrument (e.g., a credit card) may be used to authenticate the customer and be used by the system to store the receipt data in association with the customer account. Other identification devices can be utilized (e.g., scanned by the card reader). For example, a membership card, driver's license, and/or other identification mechanisms can be used.

By way of further example, the customer may enter a customer identification code (e.g., a phone number or personal identification number (PIN)) via a user entry device (which may be included in the interception device), which is then received by a remote system (e.g., an electronic receipts management system) which accesses an associated customer account. From the customer account data, the system may access payment information, such as credit card information. Optionally instead, the PIN is used to identify the customer and customer account so that the receipt data is stored in the customer's account, but the PIN is not used to provide payment. Therefore, the customer does not have to be as concerned with someone gaining access to the PIN, and so the customer is more likely to be comfortable providing the PIN to a cashier, for example, so that the cashier can manually enter the customer's PIN to the systems.

At state 206, the customer optionally provides a loyalty club identifier (e.g., via a loyalty club card, and RFID device or otherwise) which is received/read by the POS terminal, which relays the identifier to the POS backend system. The POS system uses the customer identifier to determine, in whole or in part, whether the customer is entitled to any discounts or other benefits, which are then applied to the purchase.

At state 208, once the needed purchase data has been received and optionally processed, and the receipt is ready to be printed, the POS terminal transmits printer data via a communications port directed to a POS printer. For example, the POS terminal may convert the receipt data into another format (e.g., a formatted binary stream that complies with company-specific (e.g., proprietary) and/or standardized printer formats). The printer data includes printer commands and some or all of the receipt data discussed above. At state 210, the routing device receives the raw printer data from the POS terminal (e.g., the formatted binary stream).

At state 212, the router device transmits the receipt data to a receipt management system, such as that described above. Optionally, the router device transmits the raw printer data received from the POS terminal to the receipt management system. Optionally, the router device first processes the printer data before transmitting the printer data to the receipt management terminal (e.g., extracts printer command data and/or certain selected portions of the receipt data). The printer data is also forwarded in substantially real time to the receipt printer, which then prints the receipt (e.g., translates the formatted binary stream (e.g., a company-specific (e.g., proprietary) and/or standardized formatted stream) into a rasterized receipt image printed on paper using ink, by heating thermal paper, or otherwise).

Optionally, the router device modifies the printer data prior to relaying the printer data to the printer. For example, the router device may insert coupons, advertisements, URLs, the customer PIN number, etc., into the printer data, which then may be printed out by the printer.

At state 214, the receipt management system receives (e.g., via a Web service), identifies and separates/removes the print command data from the receipt data. If the receipt data was transmitted to the system in chunks, the system may reassemble the receipt data from the chunks. At state 216, the receipt management system parses the receipt data into different parts. For example, the receipt management system may utilize regular expressions to identify and categorize strings of text of interest, such as various items of information included in the receipt data. At state 218, the receipt management system stores the receipt data in corresponding database fields in the receipt management system database, in association with the customer's account and/or the merchant's account.

Optionally, in addition to or instead of using a PIN to identify a customer, the receipt management system may analyze the receipt data (transmitted by the point of sale system to the point of sale printer) relayed by the router device to identify customer identification information. For example, some point of sale systems may have certain digits (e.g., the last for digits) of a user's credit card information printed on the receipt. Other types of customer information included in the receipt data may include customer name, phone number, address, zip code, etc. The receipt management system may identify one or more pieces of such information in the receipt data to locate a matching account associated with one or more pieces of identification (optionally in conjunction with a PIN or other identifier not included in the receipt data).

Optionally, the point of sale terminal may be used to add a customer identifier (e.g., by typing in a PIN via a keyboard, scanning a customer identification card, etc.) into the data being transmitted to the printer, and intercepted by the router device. The router device may relay the added information to the receipt management system, which can use the added information to identify the customer's account as similarly discussed above with respect to use of a PIN. Optionally, the router device may relay the added information to the printer, which may print the added identification information on the customer receipt. Optionally, the router device may identify the added information, and filter out the added information from the receipt data sent to the printer, to thereby prevent the printer from printing the added data on the receipt. Using the foregoing technique enables customer identification information to be sent to the receipt management system without the router device having a user interface to enter such information.

Figure 3:
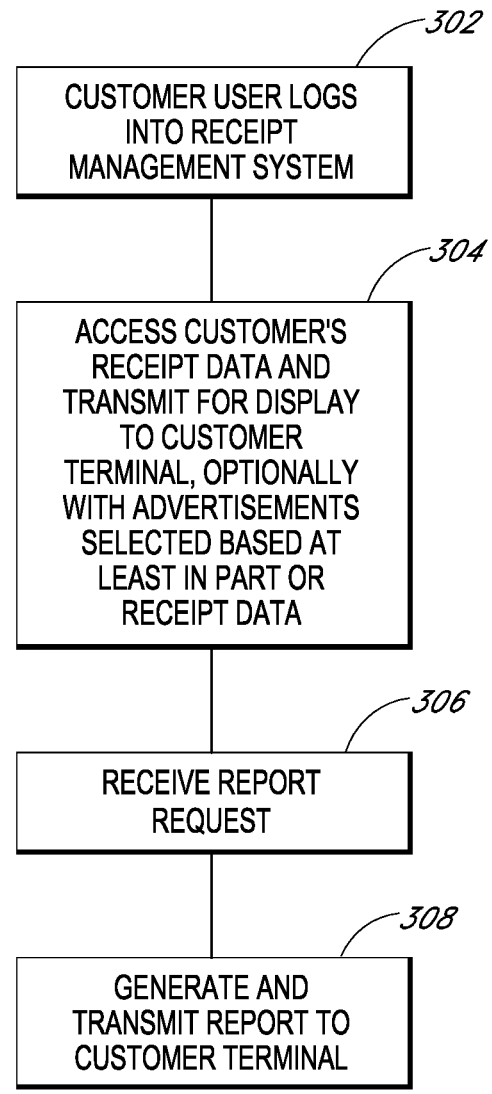
FIG. 3 illustrates an example embodiment of a receipt data retrieval process for customer receipt data.

FIG. 3 illustrates an example embodiment of a receipt data retrieval process for customer receipt data. At state 302, a customer, via a terminal, logs into a website hosted by the receipt management system. At state 304, the receipt management system accesses the customer's receipt data. Optionally, based at least in part on the customer's receipt data and/or customer profile information, the receipt management system selects advertising from one or advertisers and transmits the advertisements and receipt data over a network to the customer terminal for display to the customer. At state 306, the receipt management system receives a report request from the customer. For example, the request may be for aggregated information on the customer's spending habits, optionally over a selected period of time, for expenditures made at particular merchants, and/or for expenditures for specific categories of goods. At state 308, the receipt management system transmits the requested data to the customer terminal for display to the customer.

Figure 4:
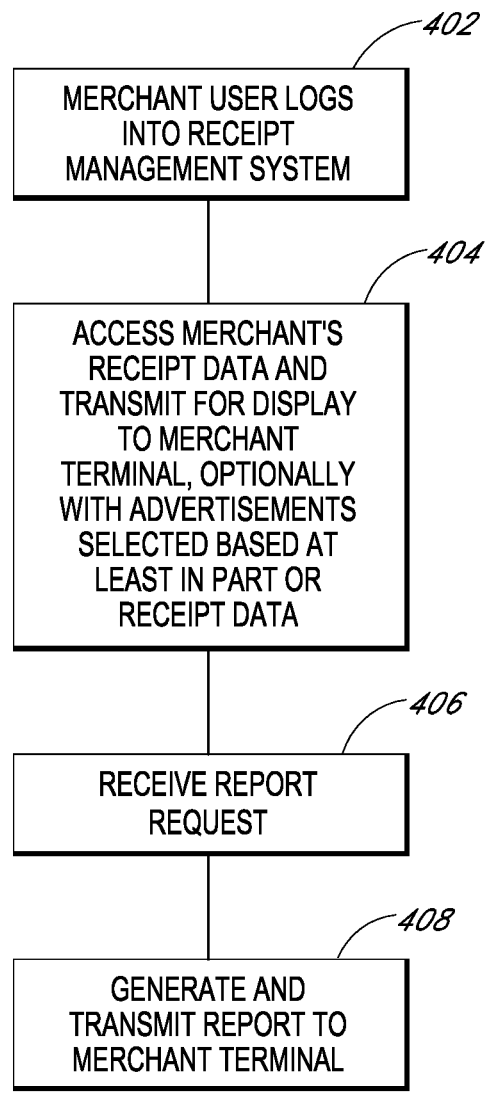
FIG. 4 illustrates an example embodiment of a receipt data retrieval process for a merchant.

FIG. 4 illustrates an example embodiment of a receipt data retrieval process for a merchant. At state 402, a merchant, via a terminal, logs into a website hosted by the receipt management system. At state 404, the receipt management system accesses receipt data for receipts transmitted by the merchant (from one or more stores) to the receipt management system for purchases made from the merchant. Optionally, based at least in part on the merchant's receipt data and/or merchant profile information, the receipt management system selects advertising from one or advertisers and transmits the advertisements and receipt data over a network to the merchant terminal. At state 406, the receipt management system receives a report request from the merchant. For example, the request may be for aggregated information for a given store of the merchant's customers' spending habits, optionally over a selected period of time, for expenditures made by customers above a certain threshold amount, and/or for expenditures for specific categories of goods. At state 408, the receipt management system transmits the requested data to the merchant terminal for display to the merchant.

Figure 5:
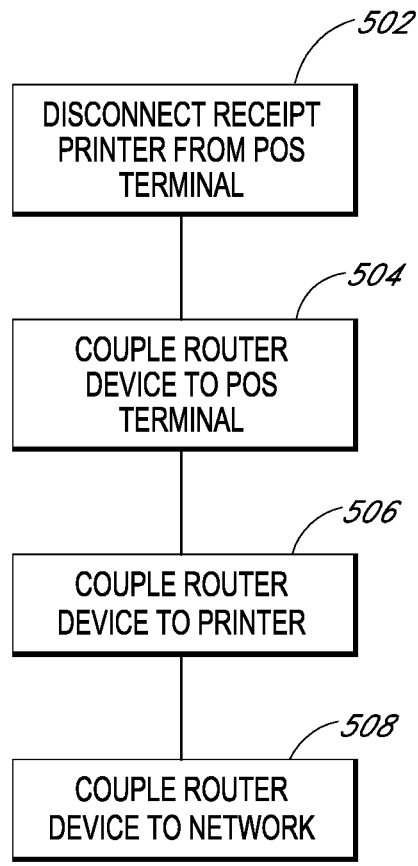
FIG. 5 illustrates a method of retrofitting an existing POS system with a router device.
Figure 7A:
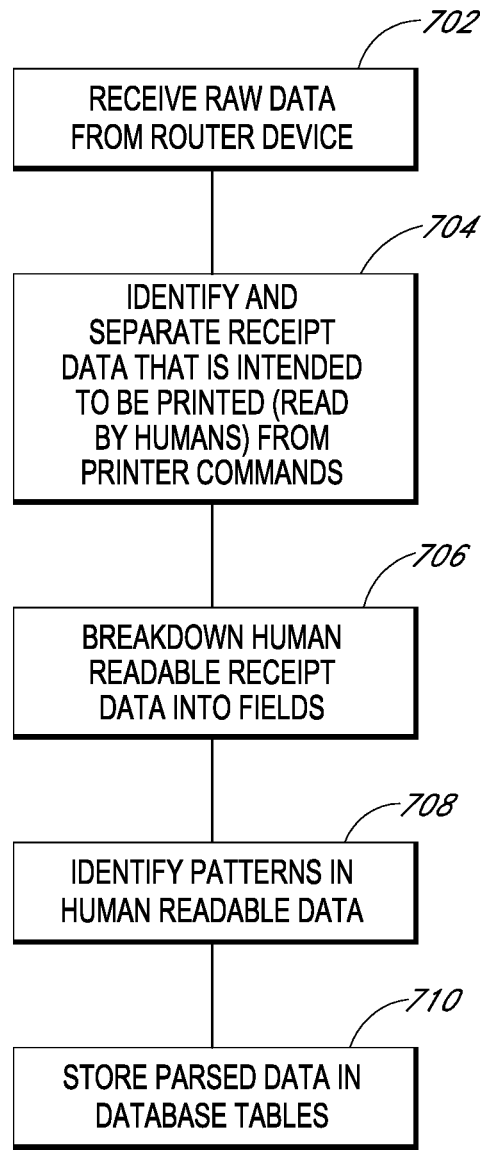
Figure 7C:
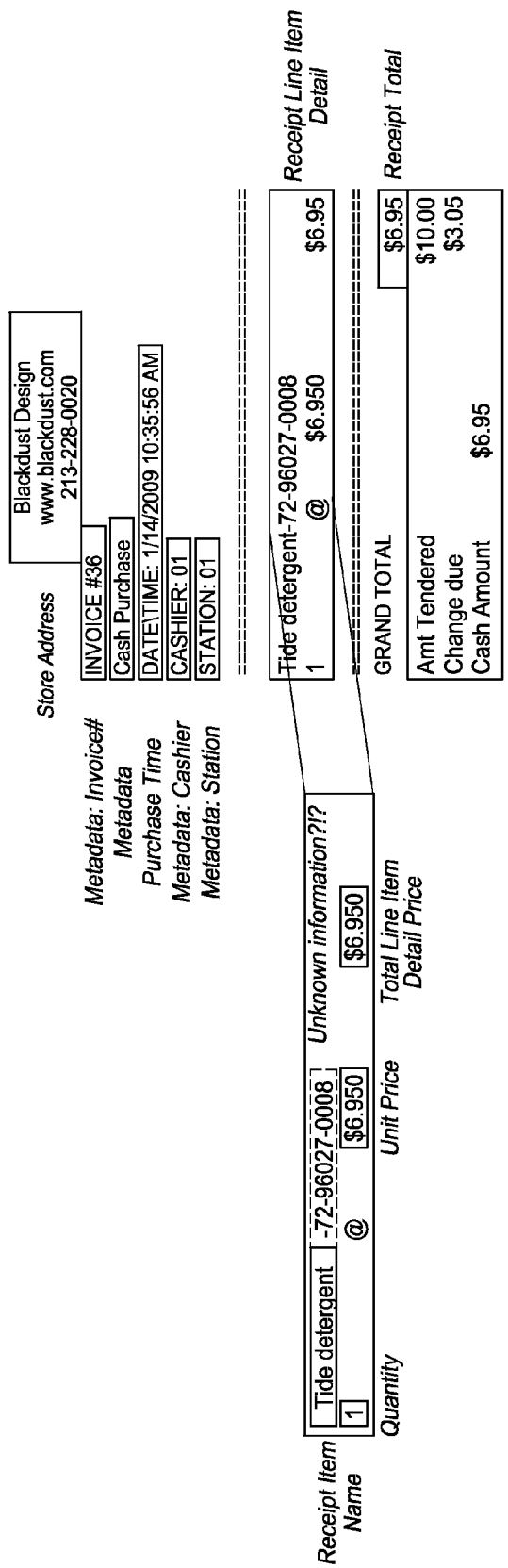

FIG. 5 illustrates a method of retrofitting an existing POS system with the router device. In this embodiment, the router device connects to a host POS terminal and optionally to a physical receipt printer, as similarly discussed above. At state 502, a receipt printer is disconnected from a POS terminal port by a user. At state 504, the router device is coupled to the same port of the POS terminal that the receipt printer was connected to (e.g., via the same cable that had previously been connected to the receipt printer on via a different cable). However, optionally, a different port and/or cable may be used.

At state 506, the receipt printer is connected to a second port on the router device. At state 508, the router device is coupled to a network (e.g., a telephone line, an Ethernet, etc.). Thus, the router device is inserted into the communications stream between the POS terminal and the printer. Data transmitted by the POS terminal to the receipt printer passes through or is relayed via the router device to the receipt printer. Similarly, messages sent from the receipt printer to the POS terminal passes through the router device, which passes the messages to the POS terminal. The router device can also relay some or all of the data passing through it to a remote system (e.g., a receipt management system) to thereby enable electronic receipts to be stored and provided to the customer and/or merchant, as discussed above.

The foregoing communications via the router device are optionally performed without having to install any software and/or without having to internally modify the POS terminal hardware (e.g., without having to open the POS terminal housing to remove and/or install a circuit card, integrated circuit chip, or other electronic device). If the router device is divided into separately housed units (e.g., an interceptor device configured to be coupled to a POS terminal and a printer, a user interface device configured to be coupled to the interceptor device, a communication device configured to be coupled to a network and to one or more interceptor devices, etc.), then the separately housed units are appropriately coupled together (e.g., via a hardwire cable and/or a wireless connection).

There are several optional benefits to the foregoing optional technique of adding electronic receipt functionally to a legacy system that did not otherwise have electronic receipt capability.

For example, by capturing and retransmitting communications between the POS terminal and the printer, the router device is able to monitor data exchanged between the POS terminal and the printer without adversely affecting their operation. Thus, in certain embodiments, no new printer drivers need be written for or installed on the POS terminal, nor does the existing printer need to be reconfigured in order to interoperate with the router device. This greatly facilitates the ability to upgrade legacy system with a relatively small amount of effort, without needing a high level of technical expertise, and without adversely affecting the reliability of the POS terminal or printer.

In addition, certain legacy printer drivers are configured to only be useable with a specific printer or printers from a specific manufacture. For example, as a security feature, certain drivers include a handshake authentication technique with respect to the receipt printer. By way of illustration, certain manufacturers use drivers that transmit a hexadecimal code to the printer, which needs to transmit back an authentication code to authenticate that the printer is from a specific manufacturer. If someone connects another manufacturer's printer to the driver (hosted on the POS terminal), the printer will not be able to return the authentication code, and the driver will not transmit printer receipt data to the printer. By using the pass-through technique described herein, authentication challenges and responses are passed bi-directionally without alteration between the POS terminal and the printer, thereby preserving the manufacturer's security, and enabling the security procedure to continue preventing printing to an "unlicensed" printer.

In addition, by inserting the interception device into the data stream between the host/POS terminal and the printer enables the interception device to alter the data transmitted from the POS terminal to the printer. For example, the interception device can insert network addresses/URL's, account information, and/or promotional messages into the printer data so that the inserted data will be printed at a described location on the associated receipt. The receipt printer will then print the receipt with the inserted data printed at the appropriate position. Thus, for example, the service provided by the receipt management system to the customer and/or merchant can be paid for in whole or in part by the advertisers whose ads are inserted and printer on the receipts.

Optionally, because certain embodiments of the interception device have access to and control over data sent to the printer, the device can be configured to suppress printing of a physical receipt (e.g., by not passing through the printer data from the POS terminal to the printer and without having to power-off the interception device), to selectively suppress the printing of certain data, to change the fonts used in printing, and/or change the positioning of the data. This optional feature enables the merchant and/or the customer to suppress, on a receipt-by-receipt basis or for all receipts, printing of the receipt (e.g., by activating a "suppress print" button), reducing consumption of ink and printer paper, and allowing the customer to avoid having to carry around or dispose of the receipt. Optionally, the consumer is still provided with an electronic receipt using one or more of the techniques described herein.

As discussed above, a PIN may be utilized to identify a customer/consumer to the receipt management system. Optionally, the PIN is printed on the consumer's receipts in addition to or instead of the customer's name. The user may generate the PIN according to certain specified criteria (e.g., the PIN may be required to have a specific number of characters (e.g., numbers), or at least a specific number of characters). Optionally, the receipt management system will automatically select/generate a PIN for the customer. For example, the system may, by default, use the last four digits of the user's phone number as the PIN or the system may generate a random number (constrained to a certain number of characters and/or types of characters) as the PIN.

Example uses of the PIN in conjunction with receipt processing and storage are provided below:

A customer at a restaurant can provide a waiter with the customer's PIN for the waiter to enter at the register, without having to worry about the waiter using the PIN to improperly purchase items using the PIN.

An employer can provide employees with company payment cards (e.g., credit cards), and provide all the employees (or a selected subset thereof) with the same PIN, wherein the PIN is associated with the company's receipt account so that the employer can have all the corresponding receipts collected by the receipt management system and stored in the employer's account. Thus, the employer can easily track and have evidence of expenditures made on the employer's behalf.

An employee can use their own personal payment device (e.g., a credit or debit card) to make purchases. However, when the employee makes a reimbursable purchase for their employer using their personal payment device, the employee can enter the company's PIN so that the receipt will be stored in the company's account on the receipt management system. When the employee makes a personal, non-reimbursable purchase, the employee can enter their personal PIN so that the receipt is stored in the employee's personal account.

Optionally, rather than using the printer interception device, the POS system can be configured integrally (e.g., via programming, etc.) to transmit receipt data directly to the receipt management system without the use of the receipt interception device and associated hardware. For example, a cashier may be able to enter customer identification information (e.g., a PIN or phone number) directly via the user interface (e.g., keypad) provided by the POS terminal.

Optionally, the receipt management system is configured to provide loopback mechanisms to SMS and/or Internet enabled handheld devices, such as cell phones, to verify purchases. For example, the system can forward all or selected portions of the receipt data (e.g., the purchase total and/or merchant at which the purchase was made) via SMS, email, the Internet, or otherwise to a customer terminal, such as a cell phone. The customer may be asked to verify the purchase (e.g., by a return SMS message) or indicate that the customer did not make the purchase, as a fraud prevention mechanism. Optionally, if the customer indicates the he did not make the purchase, a purchase charge may be declined.

Optionally, if connectivity between the router device and the remote receipt management system is down or intermittent, receipt information is queued in local memory until a connection (e.g., a reliable connection) is established. Furthermore, optionally (e.g., when certain low bandwidth transmission mediums are used, such as a dial-up modem), rather than transmit receipt data to the remote system each time a receipt is received, the router device spool and batch transmits a collection of receipts (e.g., in order to speed up transmission and processing).

FIG. 6 illustrates an example receipt. The receipt includes the name of the merchant, a website URL of the merchant, the merchant's phone number, an invoice number, an indication as to the form of payment (cash in this example), date/time of purchase, the cashier identifier, station identifier, text description of the item being purchased, an item stock number, cost per unit, total amount of purchase, amount tendered, change due, and cash amount. As previously discussed, the router device display can optionally display the receipt and/or the receipt can be printed via the POS printer. In addition, as discussed, the receipt management system receives some or all of the receipt date, with or without the printer commands, parses the data, and stores the data in a receipt database in association with the merchant's and/or customer's account for later access.

Optionally, the receipt management system can also display a realistic image of the receipt to the customer and/or merchant. For example, the receipt data can be queried from the related receipt database tables, then reassembled (e.g., by an ASP.NET web page) into a stylized webpage (e.g., using HTML) that presents the receipt data, or a portion thereof, to the merchant and/or user. Optionally, different stylizations can be used for different types of receipts. For example, a retail store receipt representation may be configured to look like a receipt printed from a POS printer, while a restaurant receipt representation may be configured to look like a restaurant receipt.

FIGS. 7A-D illustrate an example printer data formatting process. In this example, it is assumed that the parsing process, optionally hosted and executed by a remote receipt management system, receives raw printer data (printer commands and receipt data intended to be printed on a receipt so that the data can be read from a human). However, as discussed above, optionally the router device can preprocess the printer data to identify and remove the printer commands prior to transmitting the remaining receipt data to the remote system.

At state 702, raw printer data is transmitted from the router device to the remote system. For example, the raw printer commands for printer can include control codes (e.g., company-specific (e.g., proprietary) and/or standardized codes), such as printer initialization codes, codes that turn double strike on/off, codes that specify justification (e.g., center, left, right), select print color codes, codes for selecting character code tables, codes for selecting code modes, cut paper codes, select bar height codes, print barcode codes, line feed codes, codes that specify the font, font size, font style (bold, underlined, double height, double width, etc.), etc.

At state 704, the control codes are identified in the raw printer data, and based on the identification, the receipt data that is intended to be human readable is identified and extracted. The identification optionally utilizes a printer format specific program and/or lookup tables to identify and filter out the printer control codes. Different lookup tables are optionally used for different sets of control codes.

At state 706, a receipt normalization process is initiated. The extracted human readable receipt data is broken down into corresponding fields. For example, fields can include some or all of the following and/or additional/different fields and field names/labels: a label "merchant" and the associated value (the name of the merchant), a label "Website" and the associated value (the website URL of the merchant), a label "phone number" and the associated value (the merchant's phone number), a label "invoice" and the associated value (the invoice number), a label "form of payment" and the associated value ("cash" in this example), a label "date/time" and the associated value (date/time of purchase), a label "cashier" and the associated value (a cashier identifier), a label "station ID" and the associated value (a station identifier), a label "description" and the associated value (a text description of the item being purchased), a label "SKU" and the associated value (an item stock number), a label "unit price" and the associated value (the cost per unit), a label "total" and the associated value (total amount for the item), a label "savings" and the associated value (total savings for the unit), a label "subtotal" and the associated value (the subtotal value), another label "total" and the associated value (total amount of purchased), a label "amount tendered" and the associated value (the amount tendered), the label "change due" and the associated value, the label "cash amount" and the associated value, and/or other information.

At state 708, patterns in the receipt are identified (e.g., using Regular expressions). For example, the process may identify patterns that have a known meaning as determined by comparing text from the receipt data with words and/or phrases from a "dictionary" stored in memory of receipt-related words and phrases (e.g., "purchase time", "line item", "subtotal", "tax", "total", etc.) and item names (e.g., brand names of products). Thus, for example, the process may identify a receipt field label, such as "tax" and identify, by its relative "position" with respect to the label, the value associated with the label (e.g., $1.42). Further, the process may take into account the position of a label with respect to where the label would appear on a printed receipt, in determining the meaning of the receipt data. For example, the label "total" may be used at more then one location, and may have different meanings. By way of illustration, the phrase "total" as a column header may refer to the total price for a given item (unit price×quantity), while the phrase "total" towards the bottom of the receipt may refer to an overall total transaction amount.

At state 710, the labels and associated values are stored in corresponding database tables/fields, optionally in association with a unique transaction identifier, and with an association with the account(s) of the customer and/or merchant involved in the transaction.

Example user interfaces provided for display by the receipt management system will now be described.

Figure 8A:
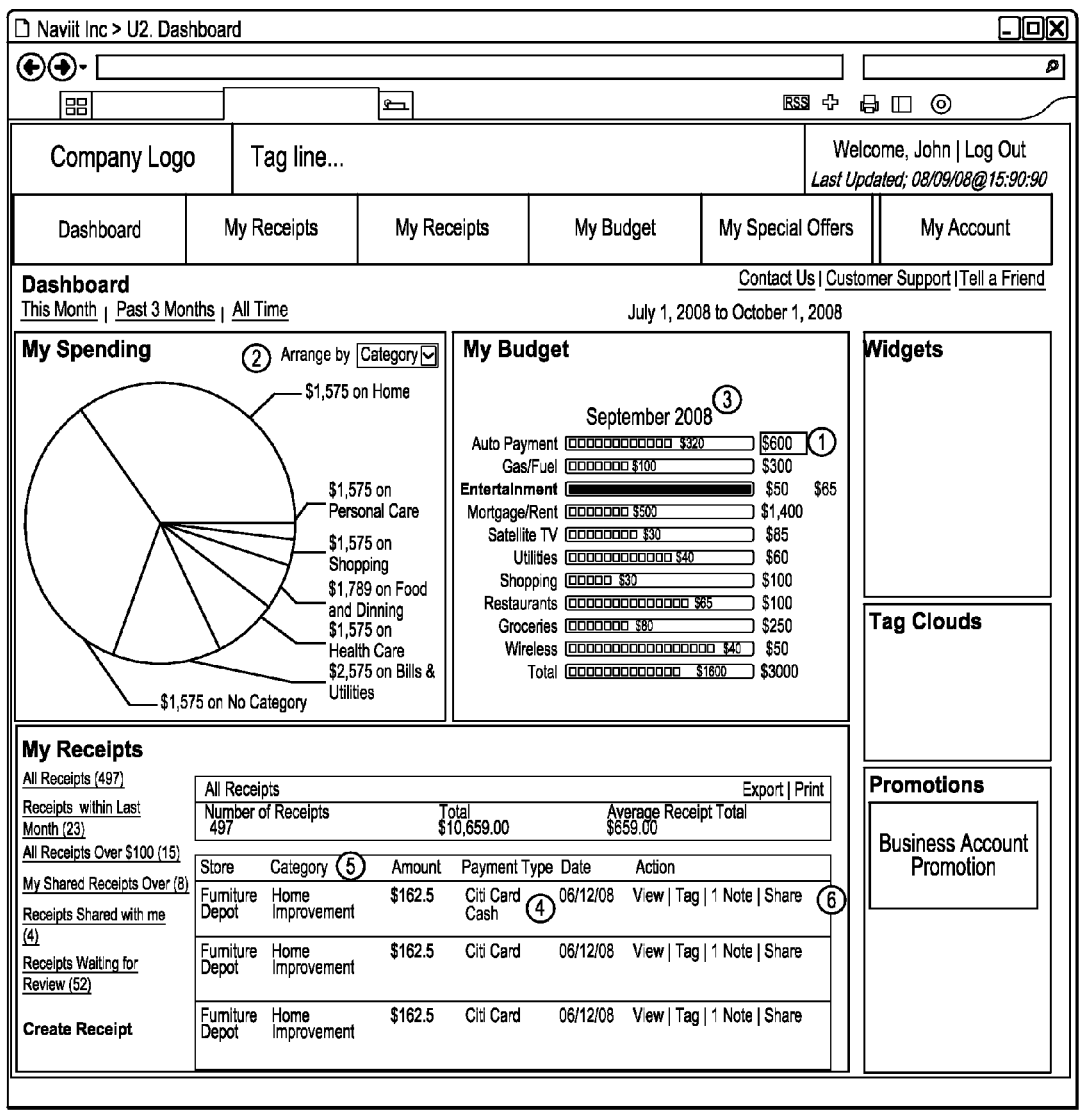

FIG. 8A illustrates an example consumer/customer dashboard user interface hosted by the receipt management system that will be transmitted over a network to the customer's terminal. In this example, a pie chart is presented illustrating the customer's spending by category. A budget section shows a budget target by category and actual spending. A "my receipts" area summarizes receipt information, including providing information on the number of receipts, the total dollar amount for the receipts, the average dollar amount per receipt. In addition, detailed information is given for individual receipts, including a store name, a store category (e.g., home improvement, groceries, entertainment, etc.), the amount, the payment type, and the date. Links are provided via which the customer can initiate an action regarding the receipt (e.g., view, tag (e.g., wherein the user can add a user or system defined tag which the user can later search on), add note (via which the user can add a comment regarding the purchase/item), share (via which the user can specify that the corresponding entry is to be made available/provided to one or more specified users/groups of users, such as the user's employer or accountant for expensing or accounting purposes)). Additional links are provided, which when activated, respectively cause all receipts to be presented, receipts within the last 12 months to be presented, receipts shared with the customer to be presented, and receipts waiting for review to be presented.

Figure 8B:
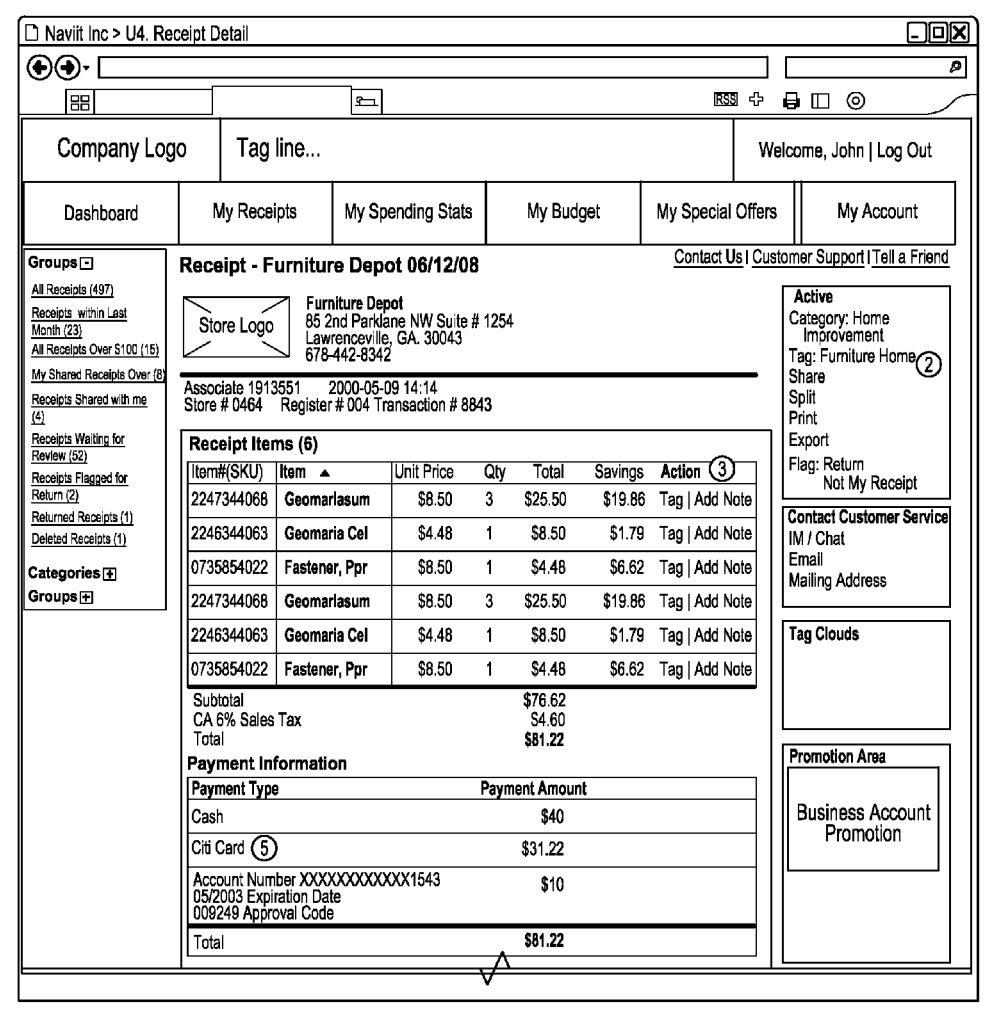

FIG. 8B illustrates an example consumer/customer receipt detail interface. The interface provides some or all of the details from the receipt and command interfaces, including some or all of the following:
Merchant name;
Merchant address;
Merchant phone number;
Associate identifier (e.g., of the sales associate that assisted in the sale);
Date/time of transaction;
Store identifier;
Checkout Register identifier;
Transaction identifier;
Summary as to the total number of purchased items on the receipt;
Item SKU (stock keeping unit);
Text description of the item;
Unit price of the item;
Quantity of a given item being purchased;
Total cost for the quantity of the given item being purchased (e.g., Quantity*Unit price);
Savings/discounts applied to purchase of the quantity of the given item;
Action links for a given item (e.g., tag, add note)
Subtotal (the sum of the item totals);
Taxes;
Total (subtotal+taxes);
Payment type;
Payment amount;
Account number (e.g., of credit card, debit card, etc.) associated with instrument used to make purchase;
Expiration date of payment instrument;
Approval code;
Total.

Figure 9:
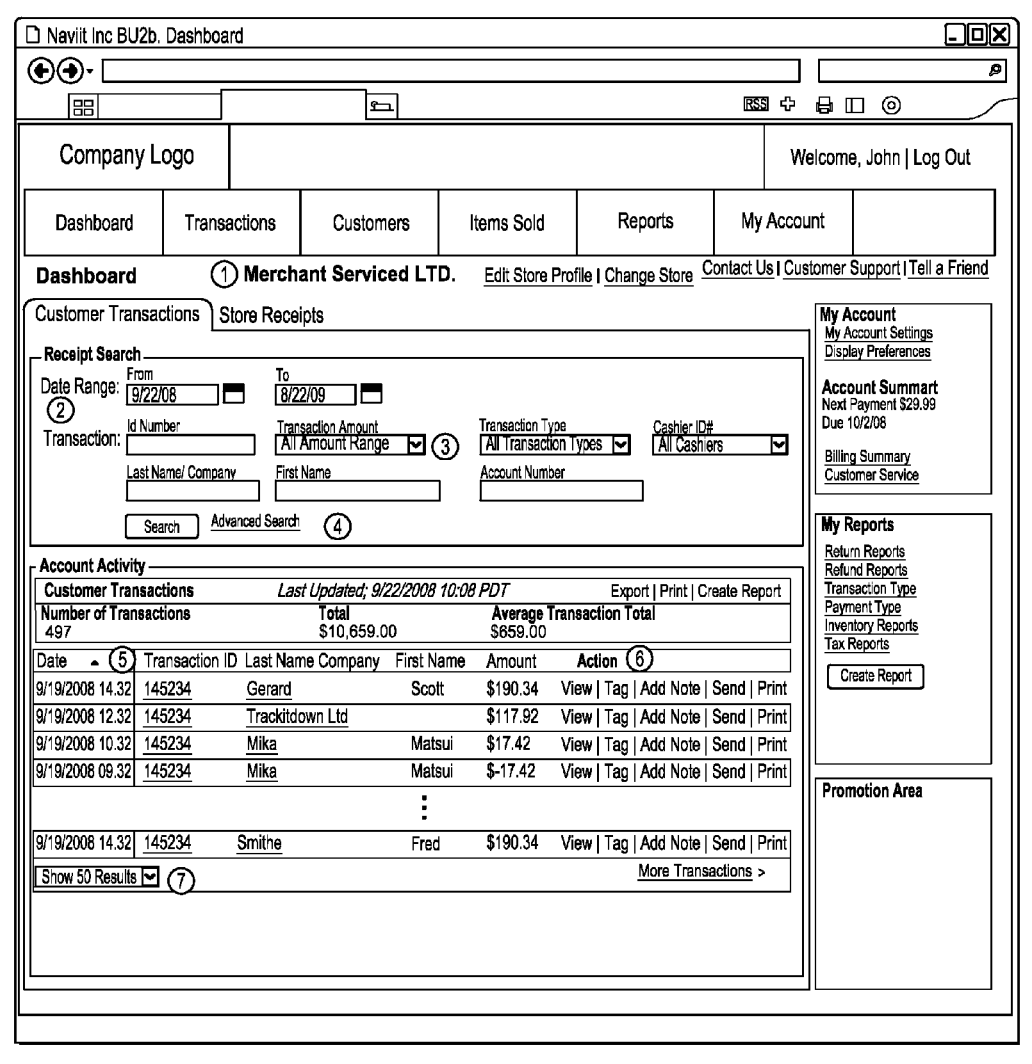

FIG. 9 illustrates an example merchant/business dashboard user interface hosted by the receipt management system that will be transmitted over a network to the merchant's terminal for display. In this example, a receipt search user interface includes fields via which the merchant can specify search criteria (e.g., from-to date range, transaction identifier, transaction amount, cashier identifier, customer name, customer account number). An account activity area summarizes customer transaction activity, including the number of transactions, the total dollar value of transaction, average transaction total, etc. In addition, detailed information is given for individual receipts/transactions, including date, transaction identifier, name/company name, amount, etc. Links are provided via which the customer can initiate an action regarding the receipt (e.g., view, tag, add note, share).

Thus, the foregoing describes certain embodiments of systems and methods that provide electronic receipts, upgrades of legacy systems, and the organization, storage, and analytics of receipt data.

With respect to the description provided herein, those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A computer implemented method of processing printer data, comprising:
   receiving raw data for generating a receipt, the raw data configured to control a printer to print the receipt using a first format, the receipt corresponding to a purchase made at a seller point of sale system by a purchaser, wherein the raw data for generating the receipt includes:
      (a1) printer commands including printer formattin commands; and
      (a2) receipt data, the receipt data including:
         (a2i) receipt variable data, including at least a currency amount;
         (a2ii) receipt label data associated with at least a portion of the receipt variable data;
   receiving an identifier and identifying an account associated with the seller and/or identifying an account associated with the purchaser;
   parsing, by a computer processing system including at least one processing device, the raw data, including the printer commands, the receipt variable data, and the receipt label data, for generating the receipt, to distinguish receipt variable data from the printer commands included in the raw data;
   storing in a non-transitory computer readable medium at least a portion of the receipt variable data, parsed from the raw data, configured to control the printer to print the receipt, in a receipt database in association with:
      (b1) the account associated with the seller, and/or
      (b2) the account associated with the purchaser; and
   providing access over a network to at least a portion of the stored receipt variable data, parsed from the raw data, using a second format different than the first format to a user.

2. The method as defined in claim 1, the method further comprising:
   parsing the raw data to identify receipt label data, including at least a tax-related label and a total-related label, using a regular expression, position information, a printer format specific program, and/or a lookup table; and
   providing the purchaser with access to at least a portion of the parsed receipt label data,
   wherein the raw data, configured to control the printer, is generated at the point of sale system and at least a portion of the printer information is transmitted over a network to a remote system configured to store at least the portion of the receipt variable data.

3. The method as defined in claim 1, the method further comprising parsing the raw data to identify:
   printer control codes; and
   receipt label data.

4. The method as defined in claim 1, the method further comprising:
parsing the raw data to identify receipt label data; and
providing the purchaser with access to at least a portion of the parsed receipt label data.

5. The method as defined in claim 1, the method further comprising parsing the printer information to identify receipt variable data, receipt label data, and/or printer commands using:
a regular expression;
position information;
a printer format specific program; and/or
a lookup table.

6. The method as defined in claim 1, the method further comprising parsing the raw data to identify receipt variable data, receipt label data, and/or printer commands using character recognition.

7. The method as defined in claim 1, the method further comprising receiving and storing receipt data parsed from raw data from a plurality of point of sale devices of the seller.

8. The method as defined in claim 1, wherein the act of identifying an account associated with the purchaser is performed, at least in part, using data parsed from the printer information raw data.

9. The method as defined in claim 1, the method further comprising intercepting the raw data, configured to control the printer, at a device connected to the point of sale system and to the printer, wherein the point of sale system generates the printer information raw data.

10. The method as defined in claim 1, the method further comprising:
intercepting the raw data, configured to control the printer, at a device connected to the point of sale system and to the printer, wherein the point of sale system generates the raw data;
inserting auxiliary information in the raw data; and
transmitting the raw data, including the auxiliary information, to the printer.

11. The method as defined in claim 1, wherein the raw data, configured to control the printer, is generated at the point of sale system and at least a portion of the raw data is transmitted by the point of sale system over a network to a remote system configured to store at least the portion of the receipt variable data.

12. The method as defined in claim 1, wherein the raw data is generated at the point of sale system, the method further comprising receiving the raw data from the point of sale system at a remote system, wherein the remote system performs at least a portion of the act of parsing the raw data to identify one or more types of receipt data.

13. The method as defined in claim 1, the method further comprising providing a user interface for display on a first terminal associated with the purchaser, the user interface including a summary of at least a portion of the receipt data included in the raw data.

14. The method as defined claim 1, the method further comprising preventing at least a portion of the receipt data from being received by the printer.

15. The method as defined claim 1, the method further comprising:
receiving the identifier, the identifier associated with the purchaser, from the point of sale system, wherein the first identifier is included in or is in association with the printer commands and receipt data, wherein the identifier includes a portion of a purchaser credit card number, a purchaser name, a purchaser phone number, and/or a personal identifier number.

16. The method as defined claim 1, the method further comprising:
receiving the identifier, the identifier associated with the purchaser from a credit card reader in association with at least a portion of the raw data.

17. The method as defined claim 1, wherein the label data includes field names corresponding to at least:
tax,
total,
date,
merchant name;
and the receipt variable data includes at least:
a tax amount,
a total purchase amount,
a purchase date,
a name of the seller.

18. An apparatus, comprising:
at least one processing device;
a non-transitory computer readable medium storing instructions, that when executed by the at least one processing device, cause the apparatus to perform operations comprising:
receiving raw data for generating a receipt, the raw data configured to control a printer to print the receipt using a first format, the receipt corresponding to a purchase made at a seller point of sale system by a purchaser, wherein the raw data for generating the receipt includes:
printer commands including printer formatting commands; and
receipt data, the receipt data including:
receipt variable data, including at least a currency amount;
receipt label data associated with at least a portion of the receipt variable data;
receiving an identifier and identifying an account associated with the seller and/or identifying an account associated with the purchaser;
parsing the raw data, including the printer commands, the receipt variable data, and the receipt label data, for generating the receipt, to distinguish receipt variable data from the printer commands included in the raw data;
storing at least a portion of the receipt variable data, parsed from the raw data, configured to control the printer to print the receipt, in a receipt database in association with:
the account associated with the seller, and/or
the account associated with the purchaser; and
providing access over a network to at least a portion of the stored receipt variable data, parsed from the raw data, using a second format different than the first format.

19. A non-transitory computer readable medium storing instructions, that when executed by a processing system including at least one processing device, causes the processing system to perform operations comprising:
receiving raw data for generating a receipt, the raw data configured to control a printer to print the receipt using a first format, the receipt corresponding to a purchase made at a seller point of sale system by a purchaser, wherein the raw data for generating the receipt includes:
printer commands including printer formatting commands; and
receipt data, the receipt data including:
receipt variable data, including at least a currency amount;

receipt label data associated with at least a portion of the receipt variable data;

receiving an identifier and identifying an account associated with the seller and/or identifying an account associated with the purchaser;

parsing the raw data, including the printer commands, the receipt variable data, and the receipt label data, for generating the receipt, to distinguish receipt variable data from the printer commands included in the raw data;

storing at least a portion of the receipt variable data, parsed from the raw data, configured to control the printer to print the receipt, in a receipt database in association with:
- the account associated with the seller, and/or
- the account associated with the purchaser; and providing access over a network to at least a portion of the stored receipt variable data, parsed from the raw data, using a second format different than the first format to a user.

20. A computer implemented method of processing printer data, comprising:

receiving raw data for generating a receipt, the raw data configured to control a printer to print the receipt using a first format, the receipt corresponding to a purchase made at a seller point of sale system by a purchaser, wherein the raw data includes:
- printer commands including printer formatting commands; and
- receipt data, the receipt data including:
  - receipt variable data, including at least a currency amount;
  - receipt label data associated with at least a portion of the receipt variable data;

receiving an identifier and identifying an account associated with the seller and/or identifying an account associated with the purchaser;

parsing, by a computer processing system including at least one processing device, the raw data, including the printer commands, the receipt variable data, and the receipt label data, for generating the receipt, to distinguish different types of data, including at least receipt variable data, included in the raw data;

storing in a non-transitory computer readable medium at least a portion of the parsed receipt data, parsed from the raw data, configured to control the printer to print the receipt, in a receipt database in association with:
- the account associated with the seller, and/or
- the account associated with the purchaser; and providing a user interface for display on at least one terminal providing the seller and/or the purchaser with access over a network to at least a portion of the stored receipt data parsed from the raw data, using a second format different than the first format.

* * * * *

UNITED STATES PATENT AND TRADEMARK OFFICE
CERTIFICATE OF CORRECTION

| | | |
|---|---|---|
| PATENT NO. | : 8,548,859 B2 | Page 1 of 1 |
| APPLICATION NO. | : 12/692461 | |
| DATED | : October 1, 2013 | |
| INVENTOR(S) | : Matkovic | |

It is certified that error appears in the above-identified patent and that said Letters Patent is hereby corrected as shown below:

On the Title Page, item [73], delete "San Francisco" and insert --San Francisco, CA (US)--.

In the Specification

Column 8 line 41, delete "tax)" and insert --tax);--.

Column 8 line 45, delete "identifier" and insert --identifier;--.

Column 8 line 48, delete "code" and insert --code.--.

Column 16 line 63, delete "for" and insert --four--.

Column 21 line 60, delete "more then" and insert --more than--.

Column 22 line 55, delete "note)" and insert --note);--.

In the Claims

Column 24 line 25, Claim 1, delete "formattin" and insert --formatting--.

Column 25 lines 23-24, Claim 8, after "from the" delete "printer information".

Column 25 line 29, Claim 8, after "the" delete "printer information".

Column 25 line 56, Claim 14, delete "defined" and insert --defined in--.

Column 25 line 59, Claim 15, delete "defined" and insert --defined in--.

Column 25 line 63, Claim 15, delete "first identifier" and insert --identifier--.

Column 26 line 1, Claim 16, delete "defined" and insert --defined in--.

Column 26 line 6, Claim 17, delete "defined" and insert --defined in--.

Column 26 line 53, Claim 18, delete "format." and insert --format to a user.--.

Signed and Sealed this
Sixteenth Day of September, 2014

Michelle K. Lee
*Deputy Director of the United States Patent and Trademark Office*